US010870251B2

(12) United States Patent
Darr et al.

(10) Patent No.: US 10,870,251 B2
(45) Date of Patent: Dec. 22, 2020

(54) METHOD AND DEVICE FOR CLOSED-LOOP CONTROL OF RAM MOVEMENT AND RAM FORCES IN MULTI-POINT SERVO HYBRID PRESSES

(71) Applicant: SCHULER PRESSEN GMBH, Goeppingen (DE)

(72) Inventors: Uwe Darr, Erfurt (DE); Bernd Moritz, Bodnegg (DE)

(73) Assignee: SCHULER PRESSEN GMBH, Goeppingen (DE)

( * ) Notice: Subject to any disclaimer, the term of this patent is extended or adjusted under 35 U.S.C. 154(b) by 115 days.

(21) Appl. No.: 16/091,525

(22) PCT Filed: Apr. 6, 2017

(86) PCT No.: PCT/DE2017/100273
§ 371 (c)(1),
(2) Date: Oct. 5, 2018

(87) PCT Pub. No.: WO2017/174077
PCT Pub. Date: Oct. 12, 2017

(65) Prior Publication Data
US 2019/0126582 A1 May 2, 2019

(30) Foreign Application Priority Data
Apr. 6, 2016 (DE) .......................... 10 2016 106 286

(51) Int. Cl.
B30B 15/00 (2006.01)
B30B 1/28 (2006.01)
(Continued)

(52) U.S. Cl.
CPC ............ B30B 15/0041 (2013.01); B30B 1/28 (2013.01); B30B 15/0035 (2013.01);
(Continued)

(58) Field of Classification Search
None
See application file for complete search history.

(56) References Cited

U.S. PATENT DOCUMENTS 5,692,404 A * 12/1997 Kirii ..................... B21D 24/00
72/15.1
2011/0132209 A1* 6/2011 Senda ................... B23Q 15/18
100/35
(Continued)

FOREIGN PATENT DOCUMENTS

DE 36 40507 A1 6/1988
DE 196 42 587 A1 4/1998
(Continued)

OTHER PUBLICATIONS

Schuler: "Press Hardening with PCH Flex—fast, flexible, cost-effective", English version of the company brochure from Schuler (2014).

Primary Examiner — Mohammad Ali
Assistant Examiner — David Earl Ogg
(74) Attorney, Agent, or Firm — Norman B. Thot

(57) ABSTRACT

A method for the control of a ram movement and ram forces of multi-point servo hybrid presses, where the positions, speeds and forces to drive the ram can be controlled independently of each other by the servo motor, which is assigned to each pressure point or each group of pressure points, for the main drive for the ram movement in the main function and the hydraulic pressure cushions, which are separately assigned to each pressure point of the ram, in an auxiliary function, to influence process-induced position and force settings of the ram in a combinatory interaction to achieve an active control of draw depth and tilt.

17 Claims, 19 Drawing Sheets

(51) Int. Cl.
*B30B 15/14* (2006.01)
*B30B 15/26* (2006.01)
*G05B 19/042* (2006.01)
*B30B 15/16* (2006.01)
*G05B 19/18* (2006.01)

(52) U.S. Cl.
CPC .............. *B30B 15/14* (2013.01); *B30B 15/16* (2013.01); *B30B 15/26* (2013.01); *G05B 19/042* (2013.01); *G05B 19/182* (2013.01); *G05B 2219/37399* (2013.01); *G05B 2219/41273* (2013.01)

(56) References Cited

U.S. PATENT DOCUMENTS

| | | | |
|---|---|---|---|
| 2012/0192615 A1 | 8/2012 | Martinez Ortiz del Rio et al. | |
| 2013/0151002 A1* | 6/2013 | Spiesshofer | B30B 15/26 700/206 |
| 2014/0202223 A1* | 7/2014 | Kohno | B21D 24/14 72/20.1 |
| 2014/0202345 A1 | 7/2014 | Wood | |
| 2015/0047517 A1* | 2/2015 | Spiesshofer | B30B 15/165 100/35 |

FOREIGN PATENT DOCUMENTS

| | | | | |
|---|---|---|---|---|
| DE | 101 58 861 A1 | 6/2003 | | |
| DE | 10 2005 012 876 A1 | 9/2006 | | |
| DE | 10 2006 059 796 A1 | 6/2008 | | |
| DE | 10 2012 201 247 A1 | 8/2012 | | |
| DE | 10 2012 100 325 A1 | 7/2013 | | |
| EP | 0773076 A1 * | 5/1997 | ............. | B21D 24/14 |
| EP | 1861214 B1 * | 12/2008 | ............. | B21D 24/10 |
| EP | 2 813 357 A1 | 12/2014 | | |
| JP | 2012-40568 A | 3/2012 | | |
| WO | WO 2008/071154 A2 | 6/2008 | | |
| WO | WO-2008071154 A2 * | 6/2008 | ......... | B30B 15/0041 |
| WO | WO 2013/026137 A1 | 2/2013 | | |

* cited by examiner

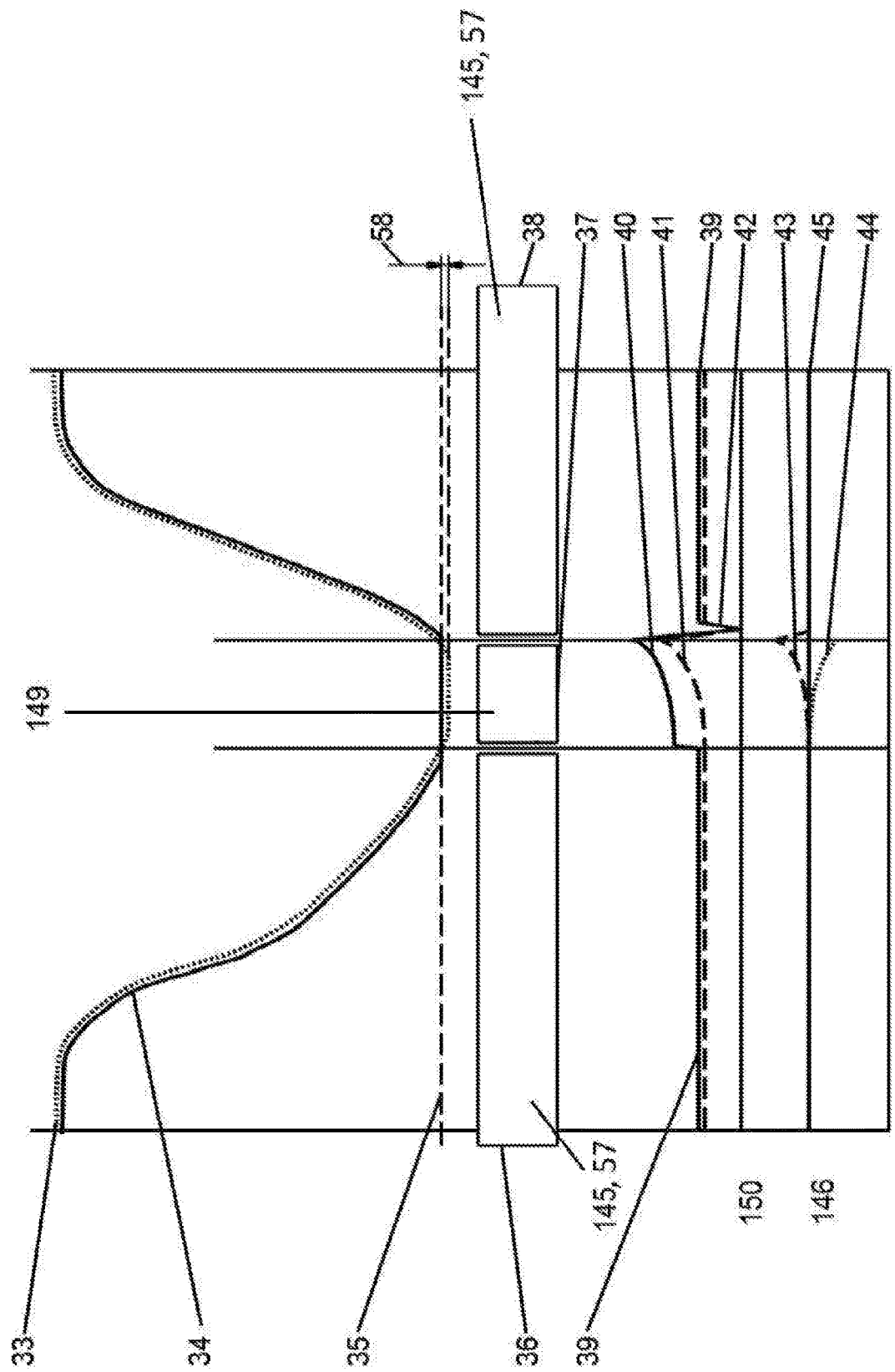

though a possibility to control the force in combination with pressure cushions to which a pressure can be applied hydraulically, particularly while the ram is in a standstill phase at the bottom dead center, to influence process fluctuations during the production of warm-pressed shaped parts.

METHOD AND DEVICE FOR CLOSED-LOOP CONTROL OF RAM MOVEMENT AND RAM FORCES IN MULTI-POINT SERVO HYBRID PRESSES

CROSS REFERENCE TO PRIOR APPLICATIONS

This application is a U.S. National Phase application under 35 U.S.C. § 371 of International Application No. PCT/DE2017/100273, filed on Apr. 6, 2017 and which claims benefit to German Patent Application No. 10 2016 106 286.3, filed on Apr. 6, 2016. The International Application was published in German on Oct. 12, 2017 as WO 2017/174077 A1 under PCT Article 21(2).

FIELD

The invention relates to a method to control the ram movement and the ram forces of multi-point servo hybrid presses, and a device to carry out the.

BACKGROUND

Technical solutions for the production of warm-pressed shaped parts with hydraulic presses are known whose ram movement is temporally halted at the bottom dead center with top and bottom dies closed during a dwell time for the shaped part to harden. The pressure while at rest can be set such that a fast and optimum thermal transfer takes place between the warm-pressed shaped part and the closed dies which are equipped with cooling. Compared to mechanical presses, hydraulic presses have a lower productivity on the one hand and higher energy consumption resulting from their lower efficiency on the other.

When the movement sequence including the resting phase is controlled as a function of time, disturbances in the movement curve can increase the risk of asynchrony with peripheral automation devices in particular.

A hydraulic warm-forming press is known from the brochure of the company Schuler "Hot stamping with PCH FLEX—Fast, flexible, cost-effective", published at www.schulergroup.com/major/download_center/broschueren_hydraulic_press/download_hydraulic_press/hydraulic_press_leichtbau_broschuere_formhaerten_pch_e.pdf on 5 Aug. 2014, where to produce multiple shaped parts in particular, a contact pressure which can be optimized individually by the hydraulic cushions in the ram and press bed integrated into the press can be applied to every part-specific die of the multiple parts to facilitate a high heat transfer from the shaped parts into the cooled dies to achieve a short cooling time.

JP 2012-040568 A describes a method to produce warm-pressed shaped parts with a mechanical press whose ram is driven by a servo-motor via several pressure points. During a standstill phase of the top and bottom dies, which are closed at the bottom dead center, the shaped part hardens.

DE 102012 201 247 A1 describes a mechanical warm-forming press with a crank mechanism to drive the ram, whose lubricated bearings are designed to be in a hydrostatic mode especially while the ram is at rest under load at the bottom dead center. This solution is intended to ensure that the lubrication conditions in the crank mechanism are maintained during the standstill phase under the greatest load so as to prevent the press from seizing up.

The disadvantage of the travel-dependent operating mode of the mechanical press in the two last-mentioned solutions consists in not being able to compensate process fluctuations occurring as a consequence of varying mechanical and thermal material properties of the shaped parts either by way of the travel or the force to achieve a reproducible pressing and hardening process during the standstill phase of the ram at the bottom dead center.

DE 3640507 discloses a mechanical drawing press with a device to control and regulate the sheet holding force during the drawing process, where a hydraulic element which is positioned in the load path of the drive points of the sheet metal holder ram can bring about a change to the holding force for the metal sheet during the drawing process by means of proportional or servo valves.

DE 10158861 describes a device to move a ram of a press, where a first stroke element is provided in the form of a spindle-spindle nut unit for a movement along a first pre-defined path and a hydraulically movable second stroke element with a piston which is guided in a cylinder so it cannot rotate is provided for a movement along a second path.

Control and regulation of the ram movement and the ram forces when the top and bottom dies are closed while the ram dwells in the vicinity of the bottom dead center to harden warm-pressed shaped parts are not provided in the solutions of the two last-mentioned documents.

WO 2013/026137 A1 discloses a mechanical press to produce warm-pressed shaped parts with a ram which is driven by a servo-motor via one central or two adjacent pressure points and one hydraulic cushion arranged in the bed or the ram. While the ram assumes an at rest position at the bottom dead center after the pressing process with top die and bottom die closed, pressure is applied to the hydraulic cushion such that the shaped part hardens with the assistance of the die cooling.

A separate, mutually independent pressure control of each of the hydraulic cushions in the ram and/or in the bed for an optimized production of multiple shaped parts, such as described in the aforementioned Prior Art according to the brochure from Schuler "Hot stamping with PCH FLEX—Fast, flexible, cost-effective", is not disclosed.

If this were to be applied purely in the mind to the solution according to WO 2013/026137 A1, differing forces in the individual cylinders of the hydraulic cushions would result in a disadvantageous tilting of the ram because of the off-center loading of the one central or the two adjacently arranged pressure points which would occur in that case.

This disadvantage then similarly exists with the Prior Art mentioned first in the introduction as well as with the solution according to the Schuler brochure "Hot stamping with PCH FLEX—Fast, flexible, cost-effective", especially when the hydraulic presses used have the drive cylinders in one, two or three point design arranged in a line in the center.

WO 2008/071154 A2 describes a method and a device to control with feed-back or open-loop the positional deviations of the ram by means of a draw depth and tilt control of servo-electric presses, where the draw depth on the one hand and the tilt position of the ram on the other can be controlled with feed-back or open-loop as the ram passes through the bottom dead center. This does not afford a possibility to control the force in combination with pressure cushions to which a pressure can be applied hydraulically, particularly while the ram is in a standstill phase at the bottom dead center, to influence process fluctuations during the production of warm-pressed shaped parts.

SUMMARY

An aspect of the invention is to create a non-complex method and a device to control the ram movement and ram forces of servo hybrid presses, especially warm-forming presses, whereby the reproducibility of the quality of the shaped parts to be produced is improved, despite the impact of process-related mechanical and thermal influencing factors especially during the production of sometimes different multiple shaped parts in order to achieve an optimal heat transfer from the shaped parts into the cooled dies, the productivity is enhanced while at the same time the energy consumption is reduced, and the drive power of the press is reduced.

In an embodiment, the present invention provides a method for the control of a ram movement and ram forces of multi-point servo hybrid presses, where the positions, speeds and forces to drive the ram can be controlled independently of each other by the servo motor, which is assigned to each pressure point or each group of pressure points, for the main drive for the ram movement in the main function and the hydraulic pressure cushions, which are separately assigned to each pressure point of the ram, in an auxiliary function, to influence process-induced position and force settings of the ram in a combinatory interaction to achieve an active control of draw depth and tilt.

BRIEF DESCRIPTION OF THE DRAWINGS

The present invention is described in greater detail below on the basis of embodiments and of the drawings in which:

FIG. 4 shows typical movement curves of the pressure points of the ram, the curve of the force in the pressure cushions, and the tilt position of the ram according to the first embodiment of the present invention;

DETAILED DESCRIPTION

Figure 1:
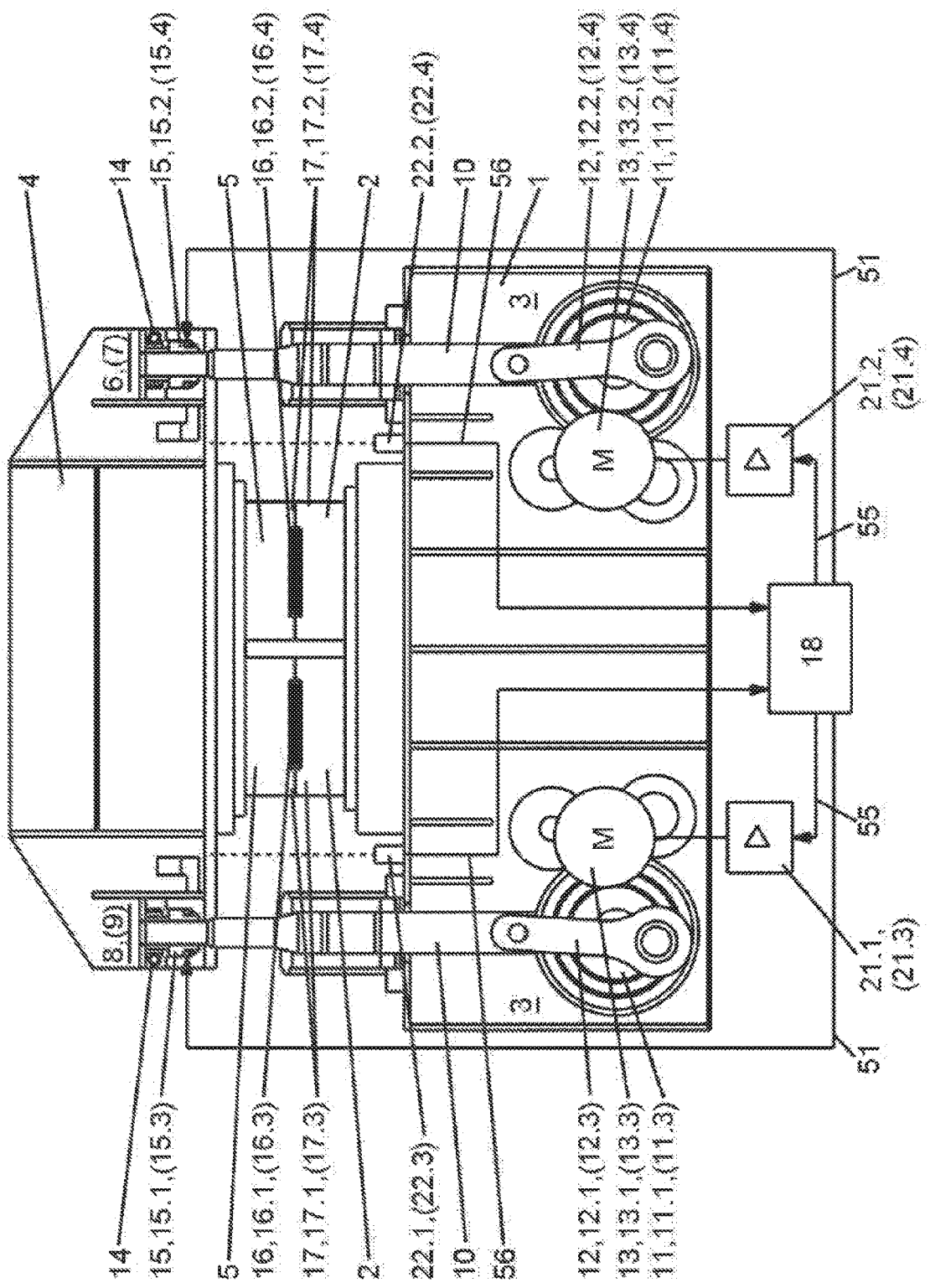
FIG. 1 shows a principal set-up of a mechanical multi-point servo-hybrid press according to the first and second embodiment of the present invention.

The key idea of the invention consists in the fact that, in a mechanical multi-point servo hybrid press which is characterized by high productivity and reduced energy consumption, the servo electric drive which is assigned to each pressure point or each group of pressure points of the ram in the main function is so in combinatory interaction via a control shaft function with the drives integrated in the press in an auxiliary function in the form of hydraulic pressure cushions in the pressure points of the ram drive and/or as process cushions acting as machine or die cushions such that, on the one hand, a high closing force of the ram before and during its closed phase to form and harden the warm-formed pressed part and a low opening force of the ram after the closed phase is achieved with a reduced drive power, and that, on the other, the hydraulic cushions in the pressure points of the ram/or the process cushions in combination with the servo electric main drive can each be controlled independently of each other before, during and after the closed phase of the ram at the bottom dead center in a way which is path dependent and force dependent to compensate process fluctuations resulting from varying mechanical and thermal factors influencing the properties of the warm-formed shaped parts for an active control of draw depth and tilt.

The process cushions in the form of machine cushions which act as auxiliary drives can be arranged in the bed or ram of the press in each case. They can each be arranged in the top and bottom die in the form of die cushions.

All process cushions share the common feature that they can each be driven hydraulically or servo-electrically.

It is essential to the invention that for the open-loop control and feed-back control of all movement and force sequences necessary for the production of warm-pressed formed parts, the drive components already existing in servo-electric presses such as the main drive for the ram movement which can be programmed independently for each movement between the pressure points and the hydraulic pressure cushions in the pressure points are used above and beyond their known function as overload protection and/or the process cushions acting directly on the forming process in an advantageous combinatory interaction to avoid additional expenditure.

A "control" is particularly a process whereby a variable quantity is continuously recorded as a controlled variable, compared with another variable parameter as a reference value and is influenced to approach the reference value. For the control, a closed sequence of actions and/or a control loop exists in particular, in which the controlled variable in the action path of the control loop is continuously influencing itself, or there is no sequence of actions and/or no control loop. In the case where the control does not have a closed sequence of actions and/or does not have a control loop, so that no feedback exists, the control is an open-loop control. The term control thus includes a simple open-loop control system as well. The same applies for "control" and "controlled", which correspondingly may each comprise "open-loop control" and "open-loop controlled". These terms and definitions regarding the control refer to this present, complete document and its content in full.

In a first embodiment of the method and the device, the servo-motors assigned to each of the pressure points of the ram for the main drive for the ram movement interact in combination with the hydraulic pressure cushions in the pressure points, where the active draw depth and tilt control of the ram is "open-loop controlled, static". If the same, mirror-image or different multiple pressed parts are warm-formed, it may be advantageous for achieving an optimal heat transfer to control each or each pair of die segments with a contact pressure with separate optimization.

The differentiated and variable contact pressure is realized here by controlling the force of the hydraulic pressure cushions in the pressure points, whose target force values can be generated either empirically or by means of measurement.

The tilting of the ram and thus the dies which takes place to a greater or lesser extent as a result of off-center loading can be compensated or influenced "with correction" by means of position control of the servo drive assigned separately to each pressure point or group of pressure points by presetting the target position curves.

The asymmetric cushioning paths can be determined either by using the part-specific off-center loading taking into account the machine-specific stiffness model by operator input or can be determined by measuring the forces or the cushioning during an actual learning stroke.

In a second advantageous embodiment of the method and the device, the servo-motors assigned to each pressure point of the ram for the main drive for the ram movement interact in combination with the hydraulic pressure cushions in the pressure points in analogy with the first embodiment, whereby the active draw depth and tilt control of the ram is "controlled, dynamic" in contrast.

The signal values to determine the pressure point-specific target force values, which are initially generated empirically in analogy with the first embodiment, are summed with pressure point-specific force correction values in a first control loop, these values being determined on the one hand by means of actual force feedback and on the other by means of actual temperature feedback by dynamic measurements in the warm-forming process. The hydraulic pressure cushions are dynamically controlled from this sum value which is generated.

Furthermore, in analogy with the first embodiment, the position control of the servo drives assigned to each pressure point or group of pressure points starts initially by presetting the target position curves "with initial correction values". In a second control loop, these are summed with pressure point-specific position offsets, which are determined by dynamic measurements of the ram position measurement devices by means of actual cushioning feedback in the warm-forming process. Moreover, there is a summation with the actual temperature feedback determined from dynamic measurements in the warm-forming process. The positions of the pressure points are dynamically controlled from this generated sum value, which allows the tilt of the ram which occurs to a greater or lesser extent as a result of off-center loading to be compensated or influenced.

It is possible here to record only the maximum value of the off-center loading to be expected in the pressing cycle and its position as well as taking into account the possible varying quantity and position of the force resultant during the forming path in the movement or in the standstill during the closed phase.

In a third embodiment of the method and the device, the servo-motors assigned to the pressure points of the ram for the main drive for the ram movement interact in combination with the hydraulic process cushions for the variable application of force of the die segments, whereby the active draw depth and tilt control of the ram is "controlled, static".

The differentiated and variable contact pressure is realized here by the force control of the hydraulic process cushions in the press or in the dies, whose target force values can be generated either empirically or by means of measurement. The tilting of the ram and thus the dies which occurs to a greater or lesser extent as a result of off-center loading can be compensated or influenced by means of positional control of the servo drives assigned separately to each pressure point or group of pressure points by presetting the curves of the target position "with correction" in analogy with the first embodiment.

In a fourth advantageous embodiment of the method and the device, the servo-motors assigned to each pressure point of the ram for the main drive for the ram movement interact in combination with the hydraulic process cushions, in analogy with the third embodiment, whereby the active draw depth and tilt control of the ram is "controlled, dynamic" in contrast.

The signal values to determine the cushion-specific target force values, which are initially generated empirically in analogy with the third embodiment, are summed with cushion specific force correction values in a first control loop, these values being determined on the one hand by means of actual force feedback and on the other by means of actual temperature feedback by dynamic measurements in the warm-forming process. The process cushions are dynamically controlled from this sum value which is generated.

Furthermore, in analogy to the second embodiment, the position control of the servo drive assigned separately to each pressure point or group of pressure points starts initially by presetting the curves of the target position "with initial correction values". These are summed in a second control loop on the one hand with pressure point-specific positional offsets, which are determined by dynamic measurements of the ram position measurement devices by means of actual cushioning feedback in the warm-forming process. Moreover, there is a summation with the actual temperature feedback determined from dynamic measurements in the warm-forming process. The positions of the pressure points are dynamically controlled from this sum value which is generated.

In a fifth embodiment of the method and the device, the hydraulic pressure cushions assigned to the pressure points of the ram interact in combination with the hydraulic process cushions for the variable application of force of the die segments, where the active draw depth and tilt control of the ram takes place "open-loop controlled, static". The differentiated and variable contact pressure is realized here by the force control of the hydraulic process cushions in the press or in the dies, whose target force values can be generated either empirically or by means of measurement.

The tilting of the ram and thus the dies which occurs to a greater or lesser extent as a result of off-center loading can be compensated or influenced by controlling the force of the hydraulic pressure cushions by means of curves of the target force value "with correction".

In a sixth advantageous embodiment of the method and the device, the hydraulic pressure cushions assigned to each pressure point of the ram interact in combination with the hydraulic process cushions in analogy with the fifth embodiment, whereby the active draw depth and tilt control of the ram is "controlled, dynamic" in contrast.

The signal values to determine the cushion-specific target force values, which are initially generated empirically in analogy with the fifth embodiment, are summed with cushion-specific force correction values in a first control loop, these values being determined on the one hand by means of actual force feedback and on the other by means of actual temperature feedback by dynamic measurements in the warm-forming process. The process cushions are dynamically controlled from this sum value which is generated. In a second control loop, the target force curves calculated for the hydraulic pressure cushions are summed with pressure point-specific force correction values, which are determined by dynamic measurements of the ram position measurement devices by means of actual cushioning feedback in the warm-forming process. The forces of the hydraulic pressure points are dynamically controlled from this generated sum value.

In a third control loop, the calculated target position curves of the pressure points of the ram are summed with the actual temperature feedback determined from dynamic measurements in the warm-forming process for the time-dependent end of the closed phase. The positions of the pressure points are dynamically controlled from this sum value which is generated.

The invention is explained in greater detail below using the example embodiments as set forth in the drawings.

FIG. 1 shows the schematic setup of a mechanical multi-point servo hybrid press in accordance with the first and second embodiment. In the press bed 1, the bottom die 2 on the one hand and the drive 3 of the vertically moving ram 4 on the other are arranged to accept the top die 5. The drive 3 of ram 4 is executed via the pressure-point groups 6, 7 and 8, 9, arranged on the right and left in the illustration, where only the pressure points 6, 8 can be seen in the two-dimensional drawing. In three-dimensions, the pressure points 7, 9 which are not visible in the illustration lie behind the pressure points 6, 8, respectively, so that the multi-point servo hybrid press comprises four pressure points in this case, which are each effectively connected by means of a pull rod 10 with a connecting rod 12 belonging to a cam gear 11. In a first case, one central cam gear 11 per side is effectively connected via two connecting rods 12.1, 12.2 and 12.3, 12.4 together with the pressure points 6 and 7 as well as 8 and 9, the cam gear 11 being driven by a servo motor 13.1 and 13.2 via an intermediate transmission. In a second case, a cam gear 11.1, 11.2 and 11.3, 11.4 is assigned to each connecting rod 12.1, 12.2 and 12.3, 12.4, each cam gear 11.1, 11.2 and 11.3, 11.4 being driven in each case by a separate servo motor 13.1, 13.3 and 13.2, 13.4 via an intermediate transmission.

As an alternative to the drive 3 arranged in the illustrations as a bottom drive in bed 1, a use as top drive with its drive located in the head piece, not shown in the illustrations, is possible.

In all cases, the rotational movement produced by the servo motor 13 is converted by the cam gear 11 into a linear movement to drive the vertically moving ram 4.

In addition to an adjustment gear 14 to adjust the height setting of the ram 4, each of the pressure points 6 to 9 contains a hydraulic pressure cushion 15 which takes over the control and regulation of the movement and forces of the ram 4 in each case in a combinatory interaction with the electric servo motors 13. The hydraulic pressure cushions 15 can be used to achieve a high and variable closing force of the ram 4 before and during the standstill and closed phase for the forming and hardening of the warm-formed pressed part 16 and a low opening force of the ram 4 after the closed phase in addition to the familiar function of overload protection through its controllable and adjustable pressure variability. During the closed phase, the possibility of the variable closing force serves in particular to compensate process fluctuations which occur as a result of varying mechanical and thermal factors influencing the properties of the warm-formed pressed parts 16. When several part-specific die segments 17 arranged in the die chamber of the servo-hybrid press are used to produce the same, mirror-image or different multiple pressed parts 16.1, 16.2, it is possible for every die segment 17.1, 17.2 to be subjected to a contact pressure which can be optimized separately to facilitate high thermal transfer from the molded parts into the cooled dies to achieve a short cooling time.

In order to compensate the disadvantages of the Prior Art in respect of the tilting of the ram 4 when asymmetric loading occurs when the neighboring die segments 17.1, 17.2 are being subjected to variable and different forces, either the tilt of the ram 4 can be prevented by means of the servo motors 13 which can be controlled and regulated independently of each other by influencing the ram position or a defined tilt can be generated. To influence the tilt position and/or draw depth of ram 4, the servo motors 13 are subjected to path profiles which are different from each other. In the first above-mentioned case with one central cam gear 11 per side, the tilt position and/or draw depth of the ram 4 can be influenced in the plane from right to left. In the further above-mentioned second case with each cam gear 11.1, 11.2, 11.3, 11.4 separately assigned to each pressure point 6, 7, 8, 9, the tilt position and/or draw depth of the ram 4 can be influenced in the plane from front to rear as well as in the two planes from right to left as well as front to rear.

The NC control device 18 generates the reference value signals 55 for the servo motors 13 with associated converter 21 for the main drive of the servo-hybrid press and the reference value signals 51 for the hydraulic pressure cushions 15.1, 15.2, 15.3, 15.4 for their pressure point-specific force control. The position of the ram 4 is recorded by means of the first and second ram position measurement device 22.1, (22.2), 22.3, (22.4) arranged on the press bed 1, whose measurand signals 56 are processed in the NC control device 18.

Figure 2:
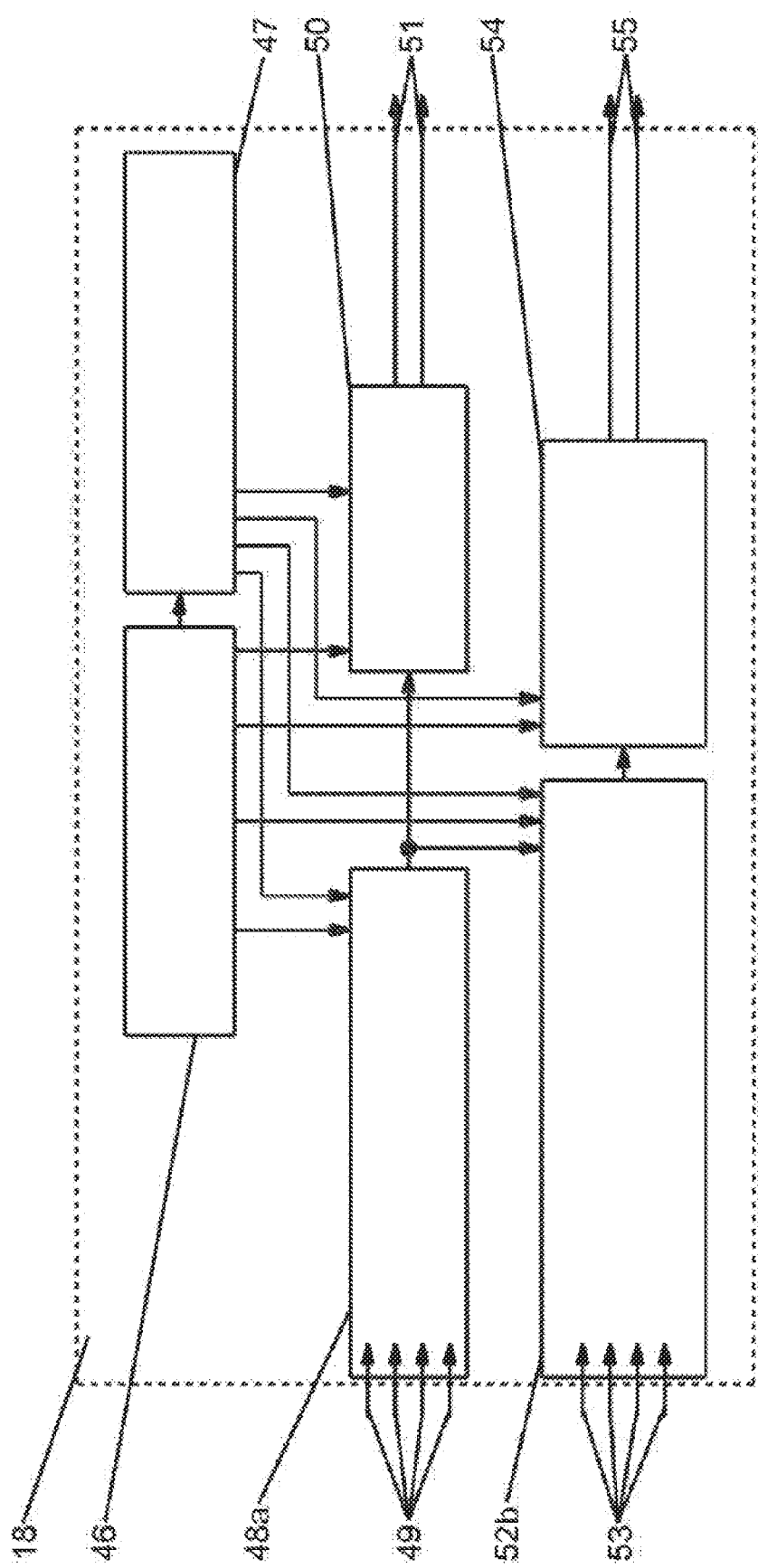
FIG. 2 shows a block diagram of the control features of the device in accordance with the first embodiment of the present invention.

FIG. 2 shows the control features of the NC control device 18 as a block diagram.

This contains the functional unit for the positional control of the pressure points of the ram 54, which is linked with the sequential control 46 on the one hand and on the other with the functional unit to calculate the target position curves for the pressure points of the ram "with correction" 52b. The further functional unit to control the force of the hydraulic pressure cushions 50 is linked with the sequential control 46 on the one hand and on the other with the functional unit to calculate the pressure point-specific curves of the target force value 48a. Specific data from the storage device for machine and die data 47 assigned to the sequential control 46 can be called up by the functional units 48a, 50, 52b, 54. The functional units 48a and 52b are likewise coordinated by the sequential control 46 and are additionally connected to each other by signaling paths. The signal values to determine the pressure point-specific target force values 49 generated empirically or by means of a measurement arrive at the functional unit to calculate the pressure point-specific curves of the target force value 48a. The signal values to determine the curves of the target positions for the pressure points of the ram 53 arrive at the functional unit 52b.

The functional unit to control the force of the hydraulic pressure cushions 50 provides the reference value signals 51 for the control of each of the hydraulic pressure cushions 15.1 to 15.4.

The functional unit for the positional control of the pressure points of the ram 54 provides the reference value signals 55 for each of the converters 21.1 to 21.4 to control the pressure point-specific servo motors 13.1 to 13.4.

Figure 3:
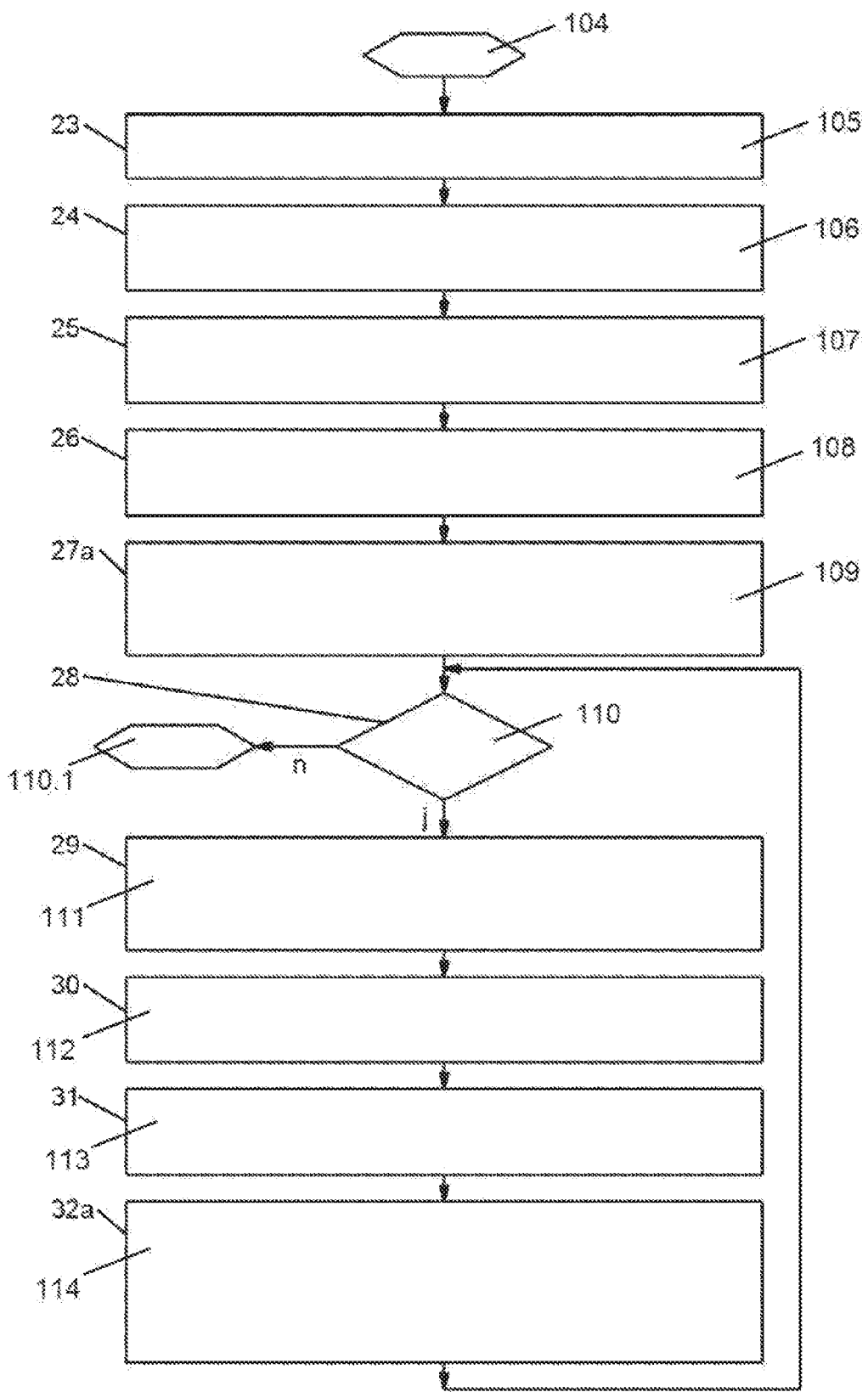
FIG. 3 shows a sequence of steps of the method with influencing of the tilt position of the ram as a result of a variable force being applied to the die segments according to the first embodiment of the present invention in accordance with the "open-loop controlled, static" type.

FIG. 3 depicts the proposed method for a first advantageous embodiment in the form of a sequence of steps with pressure point-specific force control of the die segments 17 and tilt compensation by the servo-driven pressure points 6, 7 and 8, 9 of the "open-loop controlled, static" type.

In the first preparatory phase 23, the machine-specific stiffness values are stored in the functional unit 47. The input and computation of the positional cam profile "without correction" for the main drive for the ram movement is undertaken in the second preparatory phase. The specific pressure point-specific force values for the hydraulic pressure cushions 15 for the multiple pressed parts 16.1, 16.2 are generated in the third preparatory phase 25. They can be generated by manual input or by a learning stroke with determination of an optimal contact pressure curve for a high heat transfer from the pressed parts 16 into the cooled dies 17 with a short cooling time.

In the fourth preparatory phase 26, the asymmetric cushioning values of the adjacent pressure points 6, 7 and 8, 9 are calculated using the parameters stored in step V1 and V3. Alternatively, the asymmetric cushioning paths can also be determined using measurements of the forces or the cushioning during an actual learning stroke.

In the fifth preparatory phase 27a, a pressure point-specific curve of the target position "with correction" for the movement of the ram 4 with pressure point-specific electronic positional cam profile 57 is calculated on the basis of the parameters generated in the preparatory phase 24, 26 and saved in the NC control device 18. After the start signal 28, the cyclic sequence starts with the first method step 29 where the movement of the ram 4 follows the pre-generated pressure point-specific positional cam profiles 57 "with correction" from the top dead center to the bottom dead center. The positional cam profile 57 "with and without correction" differ essentially in the phase of the force control 37 while the die 17 is closed, in which the change to be expected in the tilt position and/or draw depth as a consequence of an elastic tilt of the ram 4, caused by the asymmetric force applied to the adjacent die segments 17.1, 17.2, must be compensated. In the second method step 30, the target force values generated in the third preparatory step 25 are applied to the hydraulic pressure cushions 15. At the end of the closed phase for the temperature-controlled cooling of the warm-formed parts 16, the control of the hydraulic pressure cushions 15 effects a switch-over to the second target force value for a pressure relief of the hydraulic pressure cushions 15 in the third method step 31, to achieve a reduced opening force before ram 4 begins to move upwards.

In the fourth method step 32a, a reversing upwards movement of the ram 4 into the starting position of the top dead center is facilitated by advantageous use of the reciprocating operation with movement reversal at the bottom dead center which can be generated by means of the cam gear 11, and a switch-over to a first target force value is controlled in the hydraulic pressure cushions 15. After the fully formed pressed parts 16 have been removed and the heated blanks have been fed in again, the next cycle starts with the same sequence.

FIG. 3 is a graphic representation of the sequence of method steps with pressure point-specific force control of the die segments 17 and tilt compensation by the servo driven pressure points 6, 7 and 8, 9 oriented in the plane from right to left for a drive from FIG. 4 which reverses at the bottom dead center.

The position of the pressure points 6, 7 and 8, 9, the force in the hydraulic pressure cushions 15.1, 15.2 and 15.3, 15.4, as well as the tilt position of the ram 4 in uncompensated and compensated form is shown as a time-dependent or crank angle-dependent curve.

In the first phase 36, the positional control 145 is achieved by the electronic positional cam profile 57, whereby the position of the pressure points 6, 7 and 8, 9 follow the positional cam profile 57 and thereby control the downward movement of the ram 4 including the speed reduction at the start of the forming process. The hydraulic pressure cushions 15 are set to the first target value of the force 39 in this phase.

After the closed position 35 of the die segments 17 is reached, the force control 37 in the second phase is achieved by means of the hydraulic pressure cushions 15, where the force curve for the temperature-controlled cooling of the pressed parts 16 can be optimally adjusted such that a high heat transfer from the pressed parts 16 into the cooled die segments 17 is facilitated to achieve a short cooling time. If geometrically different press parts 16 in particular are assigned to the die segments 17, a different force curve assigned to each die segment 17 can advantageously be used with force curve 40 for die segment 17.1 and force curve 41 for die segment 17.2. The asymmetric cushioning of the press resulting from the difference in force would produce an uncompensated curve of the tilt position 43 of the ram 4 with active force control 37 and affect the contact between pressed part 16 and die segment 17. To prevent this negative effect from being realized, a difference in position 58 is achieved in this phase between the pressure points 6, 7 and 8, 9 by positional control 145 by means of electronic positional cam profile 57. Without active force control 37, the tilt position 44 of the ram 4 would be overcompensated initially. When the force control 37 is active, the desired compensation of the tilt position 45 of the ram 4 is achieved as the precondition for an ideal contact between pressed part 16 and die segment 17.

Before the start of the subsequent third phase 38, the third method step 31 executes a pressure relief to a second target force value 42 in the hydraulic pressure cushions 15 by means of force control 149, which is favorable for the upwards movement of the ram 4 starting from the closed position for a reduced opening force in the third phase 38 after the fourth method step 32. After the top dead center of ram 4 is reached with resetting to the first target force value 39, the procedure is repeated cyclically with the above-described first phase 36.

Figure 5A:
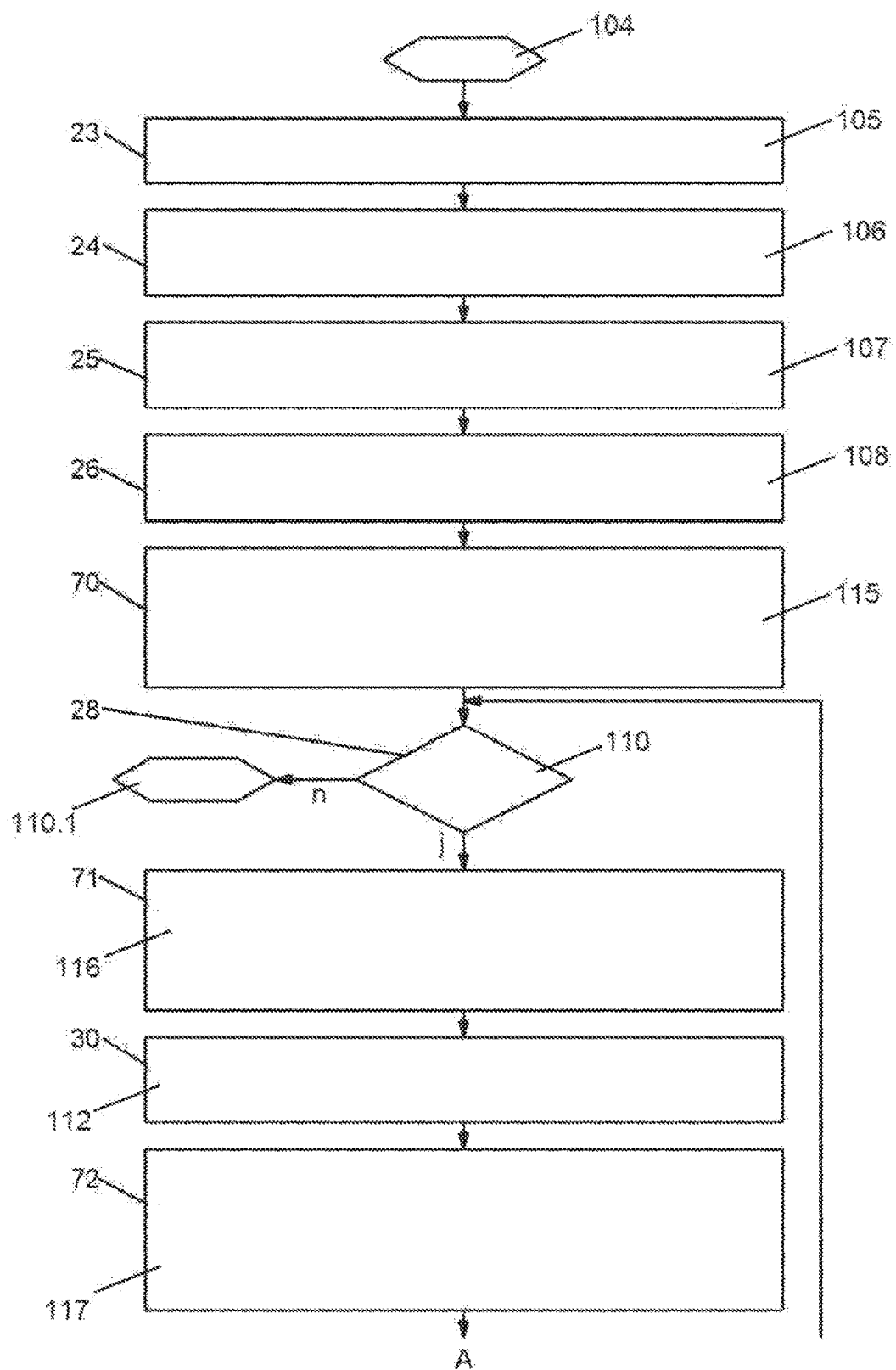
FIG. 5a shows a sequence of steps of the method with influencing of the tilt position of the ram as a result of a variable force being applied to the die segments according to the second embodiment of the present invention in accordance with the "controlled, dynamic" type.

The sequence of steps of the method with influencing of the tilt position and draw depth of the ram according to the second embodiment of the "controlled, dynamic" type can be seen from FIG. 5a, b.

Compared to the afore-described first embodiment, the force control in the hydraulic pressure cushions of the pressure points in combination with the influencing of the tilt position and draw depth of the ram can all be conducted dynamically. The first four preparatory phases 23 to 26 correspond to the sequence of the first embodiment.

In the fifth preparatory phase 70, a pressure point-specific curve of the target position with initial correction values for the movement of the ram 4 with pressure point-specific electronic positional cam profile 57 is calculated on the basis of the parameters generated in the preparatory phase 24, 26 and saved in the NC control device 18.

After the start signal 28, the cyclic sequence starts with the first method step 71, where the movement of the ram 4 follows the pre-generated pressure point-specific positional cam profile 57 with initial correction values from the top dead center to the bottom dead center.

In the second method step 30, the target force values generated in the third preparatory step 25 are applied to the hydraulic pressure cushions 15 at the start of the closed phase 35.

During the closed phase 35 of the ram 4, the curve of the actual process force 59 of each die segment 17 is recorded by means of force sensor 60 on the one hand and the curve of the actual process temperature 61 by means of temperature sensor 62 on the other. These are used for the calculation of a force correction value 63 with which together with the pressure point-specific curve of the target force value, a force sum value 64 is calculated in the fourth method step 73. In the fifth method step 74, the corrected target pressure values 65 for the servo valves 66 for the control of the force control loop of the hydraulic pressure cushions 15 are formed with this sum value 64.

During the closed phase 35 in the sixth method step 75, the pressure point-specific actual cushioning curves are recorded simultaneously by means of the ram position measurement devices 22, whose measurand signals 56 are used to calculate the pressure point-specific position offsets 67. In the seventh method step 76, a positional sum value 68 is formed from the pressure point-specific position offset 67 and the pressure point-specific target position curve with initial correction value.

A position control of the ram 4 by means of the pressure point-specific servo motors 13 with correction target value from the electronic positional cam profile 57 read out according to the virtual control shaft with position sum value 68 takes place in the eighth method step 77.

The end of the closed phase 35 is initiated as a function of time in accordance with the actual temperature 61 measured in the die segments 17 or pressed parts 16 in the ninth method step 78. Simultaneously, the pressure cushions 15 are set to a second target force value 42 for the retraction movement of the ram 4 under load to create the conditions for the commencement of the upwards movement of the ram 4 in the tenth method step 79. After the top dead center position of ram 4 is reached with resetting to the first target force value 39, the sequence is repeated cyclically with the above-described first method step 71.

Figure 6:
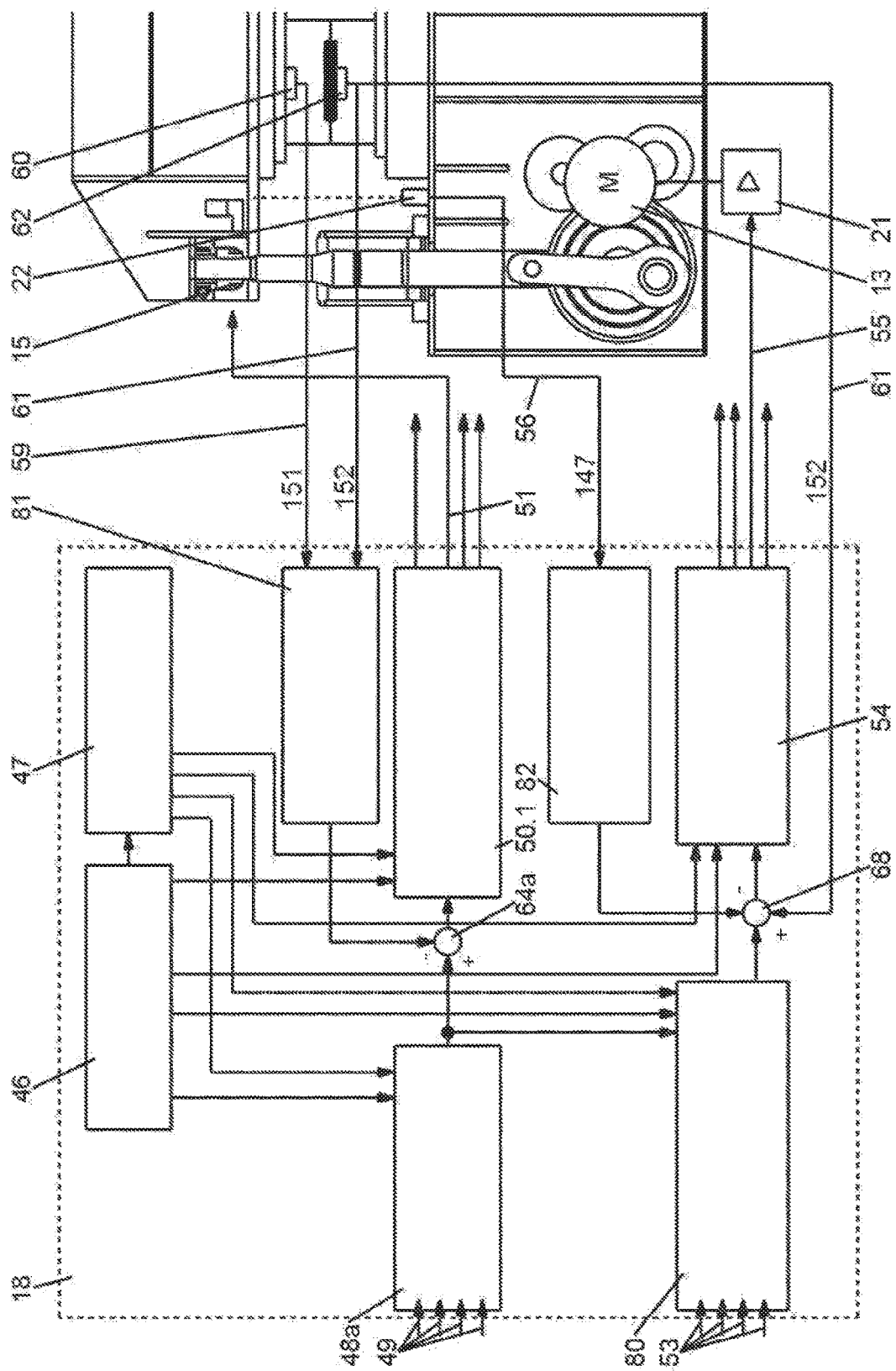
FIG. 6 shows a block diagram of the control features of the device according to the second embodiment of the present invention.

FIG. 6 shows the control technology device features of the NC control device 18 corresponding to the second embodiment as a block diagram.

This contains the functional unit for the position control of the pressure points of the ram 54, which on the one hand is linked with the sequential control 46 and on the other with the functional unit to calculate the target position curves for the pressure points of the ram with initial correction values 80 via the position sum values 68. The further input values of the positional sum value 68 originate from the functional unit 82 for the calculation of the pressure point-specific position offset 67 and from the measurand signals for the curves of the actual process temperature 61.

The further functional unit to control the force of the hydraulic pressure cushion 50.1 is linked with the sequential control 46 on the one hand and on the other with the functional unit to calculate the pressure point-specific curves of the target force values 48a via the force sum value 64a. The further input value of the force sum value 64a originates from the functional unit 81 for the calculation of the pressure point-specific force correction values 63.

Specific data from the storage device for machine and die data 47 assigned to the sequential control 46 can be called up by the functional units 48a, 50.1, 80, 54. The functional units 48a and 80 are likewise coordinated by the sequential control 46 and are additionally linked up with each other by signaling paths. The signal values to determine the pressure point-specific target force values 49 which are initially generated empirically arrive in the functional unit to calculate the curves of the pressure point-specific target force values 48a, whose initial values are summed with the force correction values 63 calculated in the functional unit 81 from the actual force feedback 59 and the actual temperature feedback 61 in the force sum value 64a.

The measurand signals 56 generated by the ram position measuring devices 22 arrive at the functional unit 82 to compute the pressure point-specific position offset 67.

The functional unit 50.1 for the force control of the hydraulic pressure cushions 15 provides the reference value signals 51 for the control of each of the hydraulic pressure cushions 15.

The functional unit 54 for the position control of the pressure points of the ram 4 provides the reference value signals 55 for the converters 21 to control each of the pressure point-specific servo motors 13.

Figure 7:
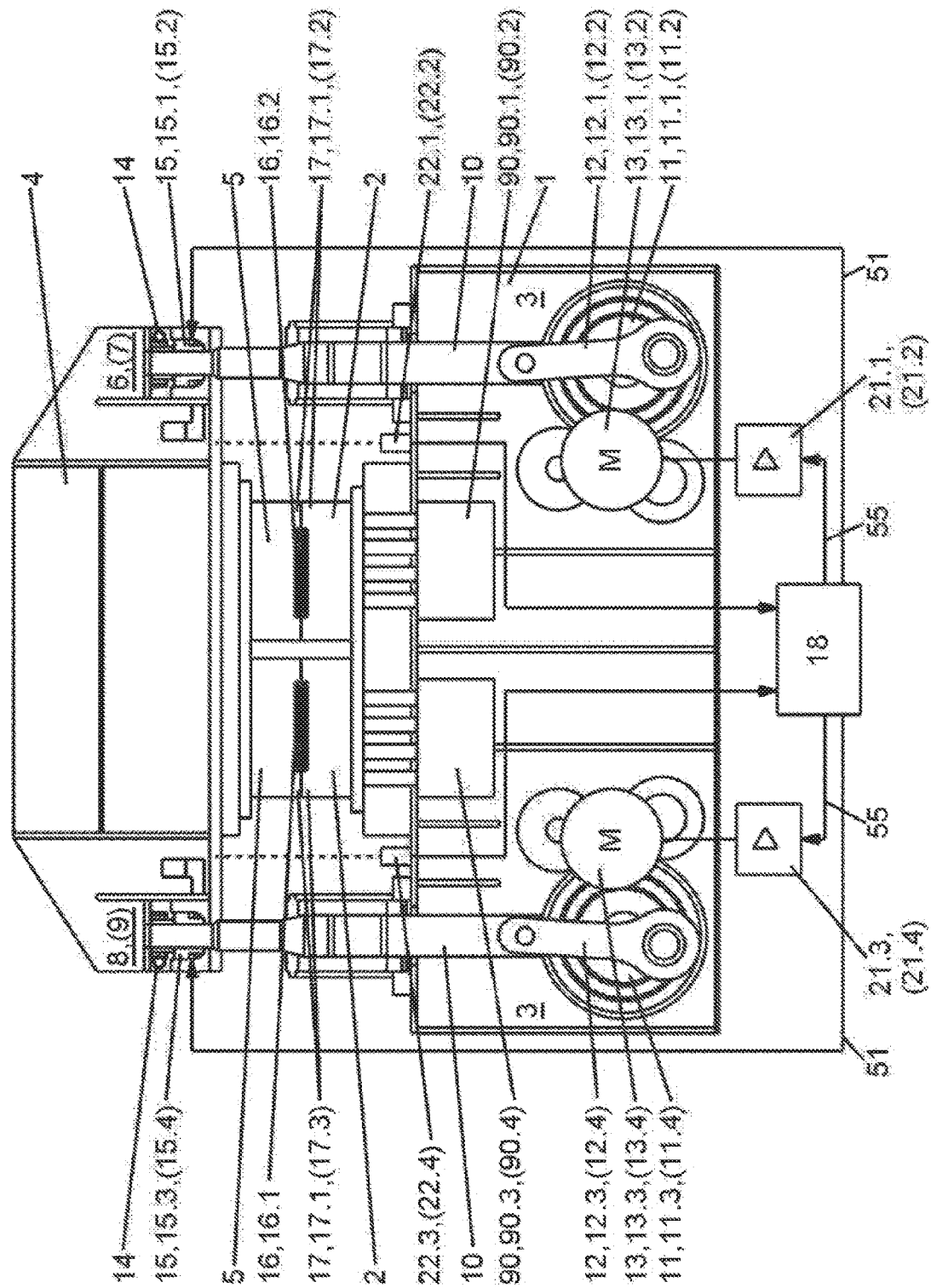
FIG. 7 shows a principal set-up of a mechanical multi-point servo hybrid press according to the third and fourth embodiment of the present invention.

FIG. 7 shows the schematic setup of a mechanical multi-point servo hybrid press in accordance with the third and fourth embodiment.

Compared to the exemplary embodiment described in FIG. 1, the multi-point servo hybrid press contains as its auxiliary drive in the form of a process cushion the hydraulic bed cushion 90 which is directly assigned to die 2, said cushion being positioned in bed 1 and taking over the control and regulation of the movement and forces for the die or dies in each case in combinatory interaction with the electric servo motors 13. The hydraulic bed cushions 90 can take the form of multi-point bed cushions, where two side-by-side bed cushions 90.1, 90.3 or four bed cushions located next to and behind each other 90.1, 90.3 and 90.2, 90.4 can be used.

It is similarly conceivable that the hydraulic cushions acting on the die or dies as auxiliary drives are situated in the bottom die 2 in each case instead of in the bed 1.

It is furthermore conceivable to arrange the hydraulic cushion acting directly on the die or dies either in the ram 4 or in the top dies 5.

In all cases, a high and variable closing force of the dies before and during the closed phase for the forming and hardening of the warm-formed pressed part 16 and a low opening force of the ram 4 after the closed phase is achieved by its controllable and adjustable pressure variability.

The hydraulic pressure cushions 15 in the force chain to the ram 4 continue to exercise the familiar function of overload protection.

Reference is made to the description of the exemplary embodiment according to FIG. 1 regarding the influence on the properties of the warm-formed pressed parts 16 in combinatory interaction with the electric servo motors 13.

Figure 8:
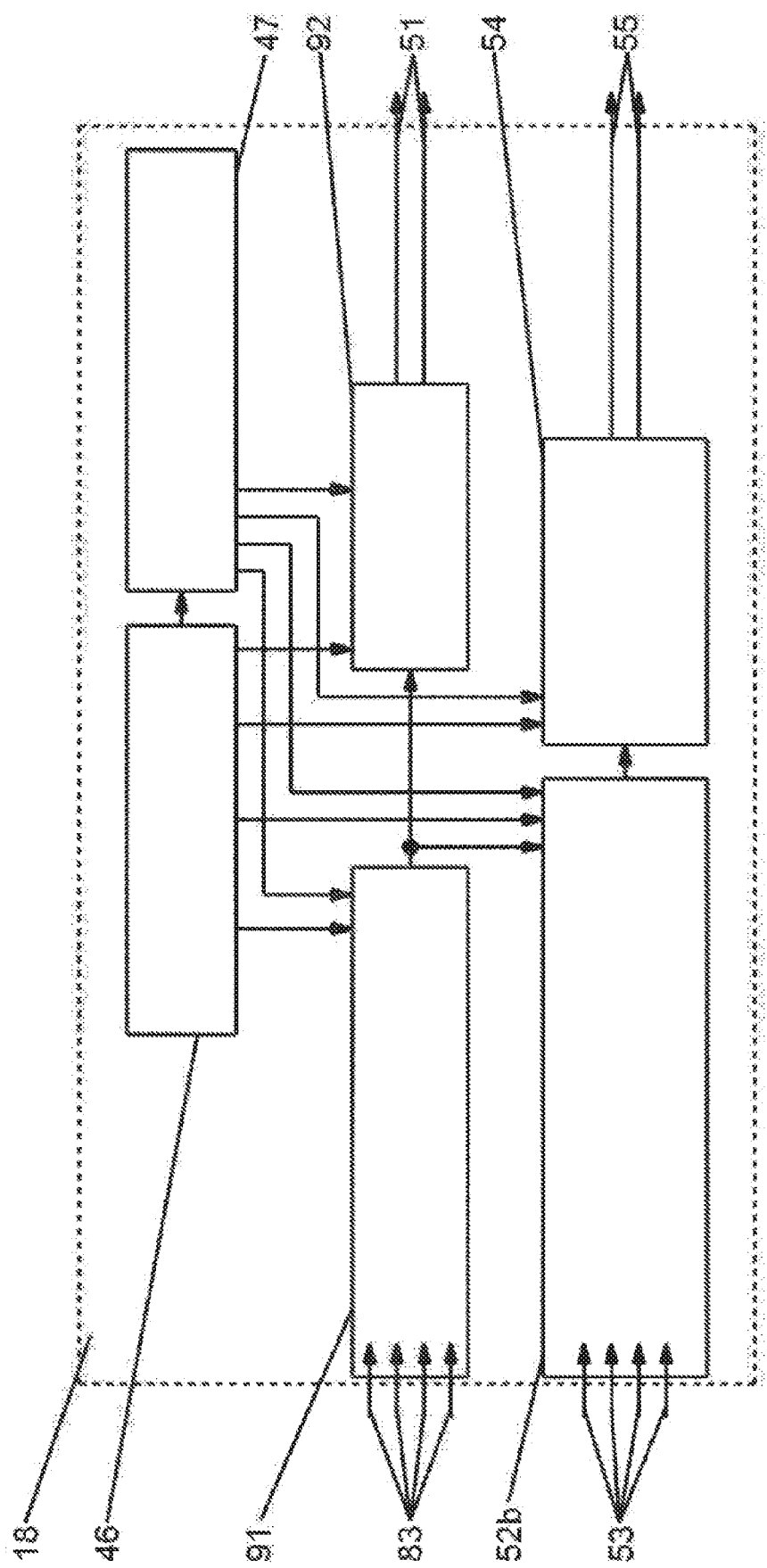
FIG. 8 shows a block diagram of the control features of the device according to the third embodiment of the present invention.

FIG. 8 shows the control features of the NC control device 18 for the third embodiment as a block diagram.

Compared to the exemplary embodiment described in FIG. 2, the functional unit to control the force of the hydraulic pressure cushions 50 is replaced by the functional unit to control the force of the hydraulic bed cushions 92 with the signal values at the input to determine the cushion-specific target force values 83 and the functional unit for the calculation of the curves of the pressure point-specific force target values 48 by the functional unit for the calculation of the curves of the cushion-specific target force value 91.

Figure 9:
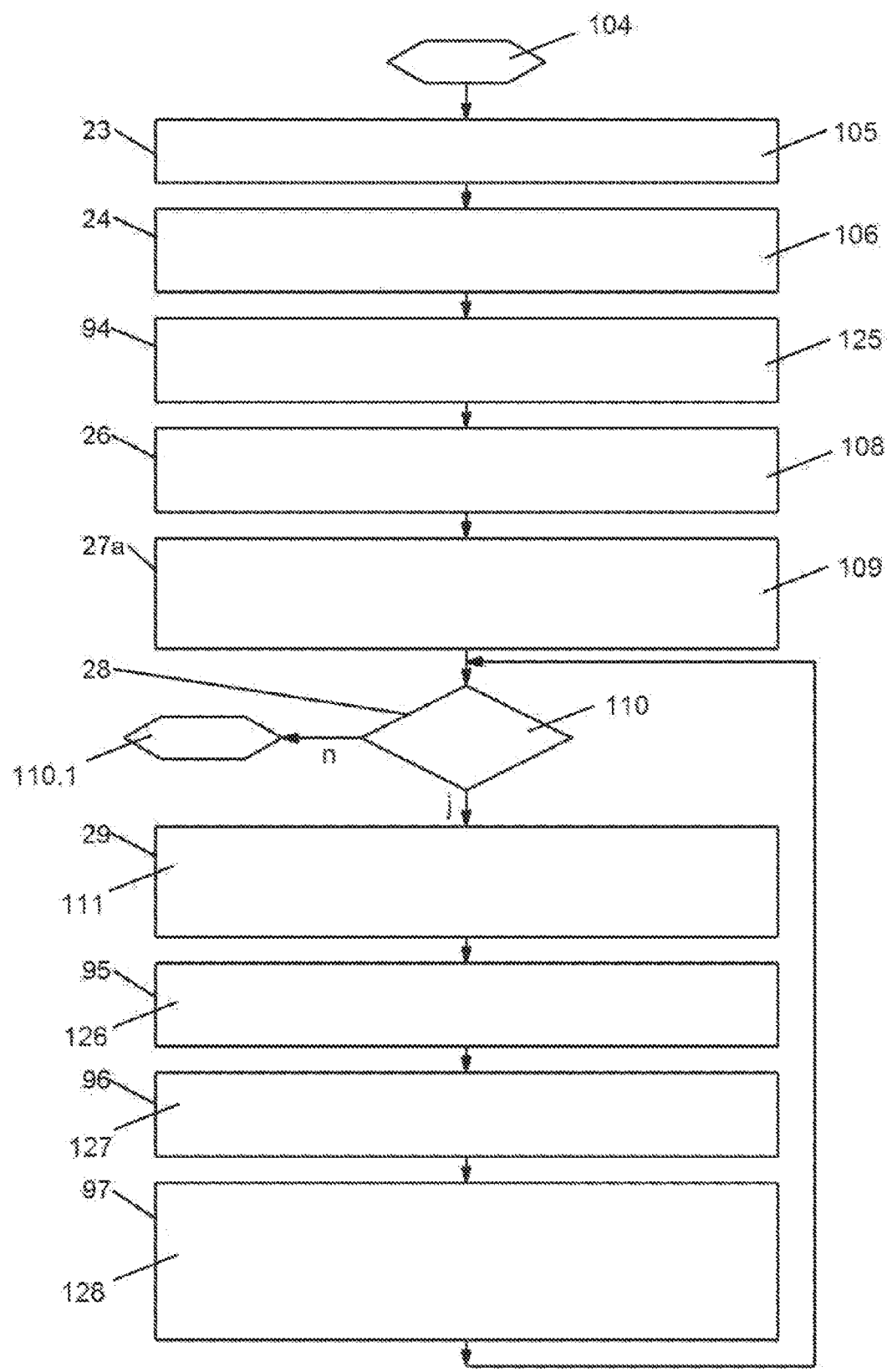
FIG. 9 shows a sequence of steps of the method with influencing of the tilt position of the ram as a result of a variable force being applied to the die segments according to the third embodiment of the present invention in accordance with the "open-loop controlled, static" type.

FIG. 9 depicts the proposed method for a third advantageous embodiment in the form of a sequence of steps with cushion-specific force control of the die segments 17 and tilt compensation by the servo driven pressure points 6, 7 and 8, 9 of the type "open-loop controlled, static".

The first and second preparatory phase 23, 24 corresponds to the sequence of the first and second embodiment according to FIG. 3. Compared to the exemplary embodiment described in FIG. 3, the cushion-specific force values for the hydraulic bed cushions 90 specific to the multiple pressed parts 16.1, 16.2 are generated in the third preparatory phase 94. Up to the second method step 95, the sequence is analogous to FIG. 3.

In the second method step 95, the target force values generated in the third preparatory phase 94 are applied to the hydraulic bed cushions 90.

In the third and fourth method step 96 and 97, the hydraulic bed cushions 90 are controlled in the same way as the control of the hydraulic pressure points 15 of the exemplary embodiment according to FIG. 3.

Figure 10A:
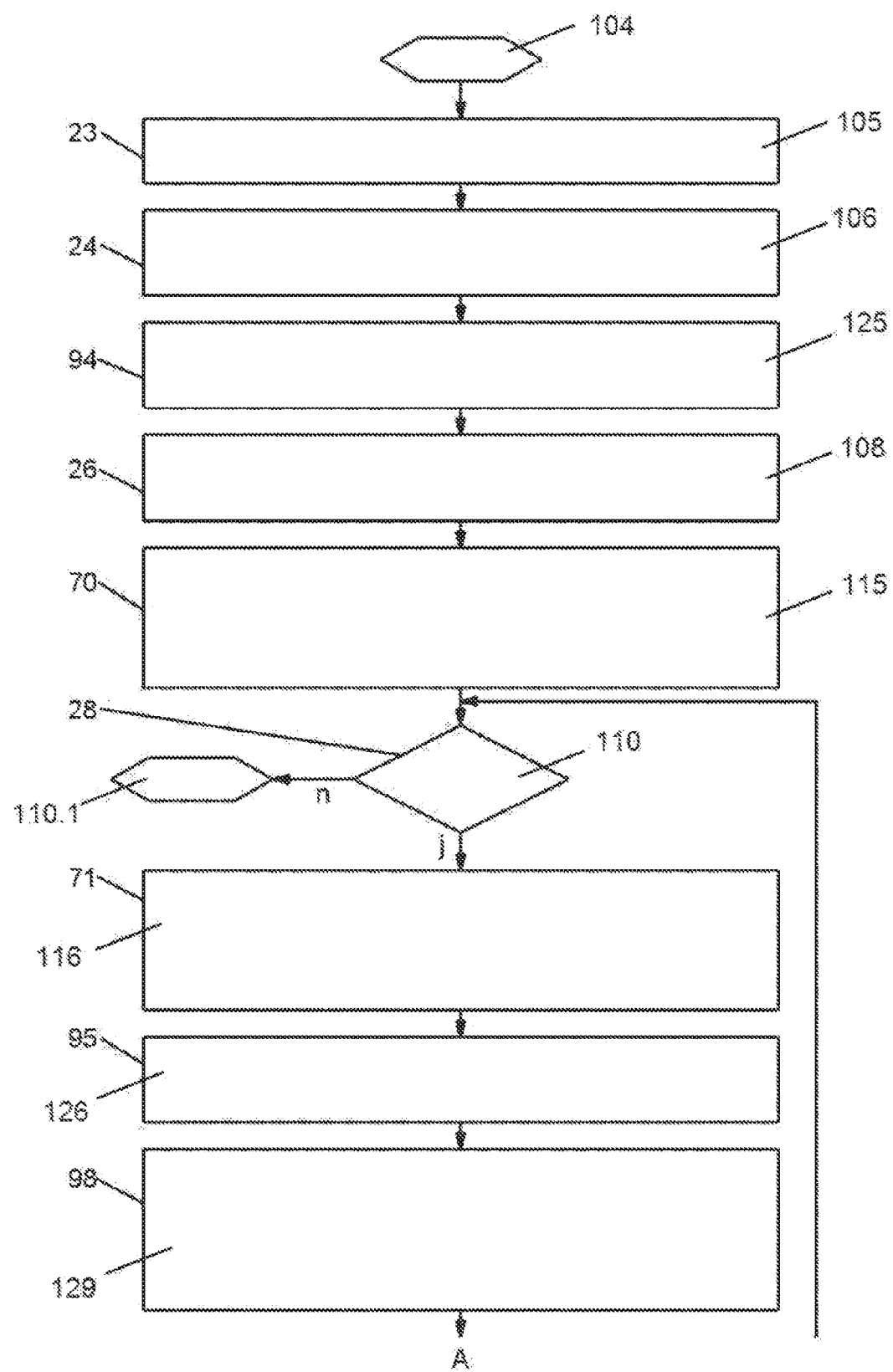
FIG. 10a shows a sequence of steps of the method with influencing of the tilt position of the ram as a result of a variable force being applied to the die segments according to the fourth embodiment of the present invention according to the "controlled, dynamic" type.
Figure 10B:
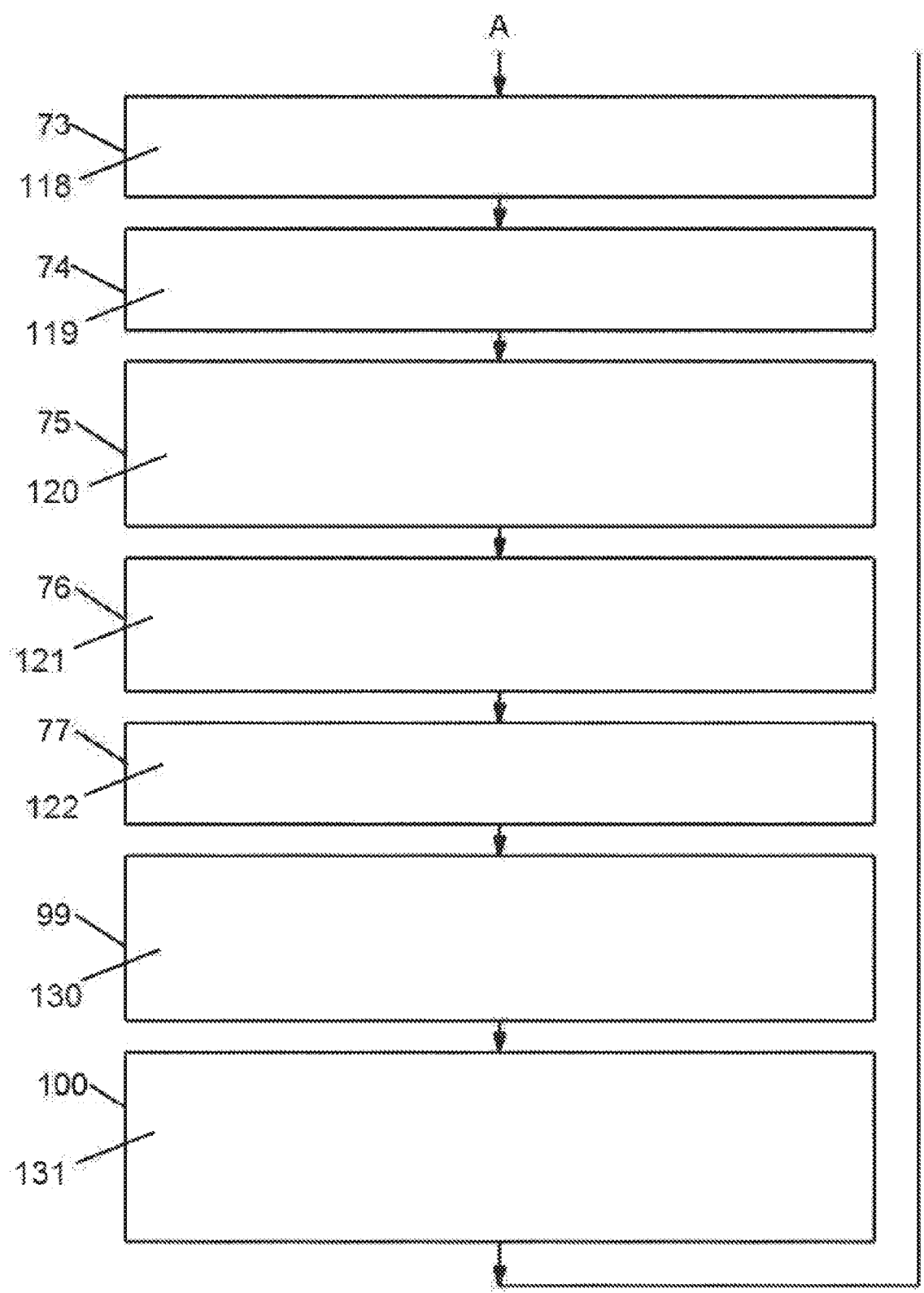
FIG. 10b shows a sequence of steps of the method with influencing of the tilt position of the ram as a result of a variable force being applied to the die segments according to the fourth embodiment of the present invention according to the "controlled, dynamic" type.

The step sequence of the method with influencing of the tilt position and draw depth of the ram 4 according to a fourth embodiment of the "controlled, dynamic" type can be seen from FIG. 10*a*, *b*.

Compared to the afore-described third embodiment, the force control in the hydraulic bed cushions 90 in combination with the influencing of the tilt position and draw depth of the ram 4 can all be carried out dynamically.

Figure 5B:
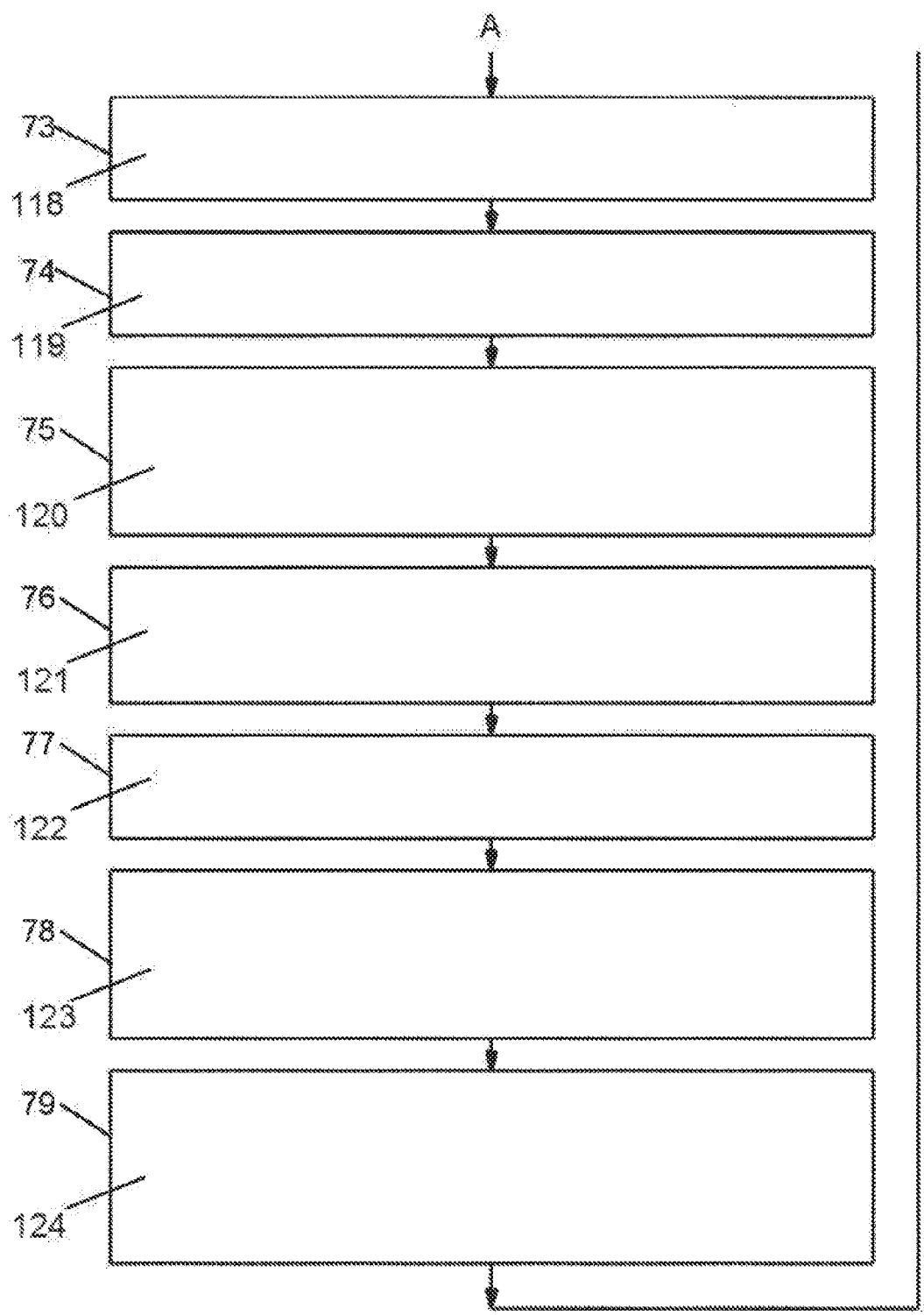
FIG. 5b shows a sequence of steps of the method with influencing of the tilt position of the ram as a result of a variable force being applied to the die segments according to the second embodiment of the present invention in accordance with the "controlled, dynamic" type.

The sequences essentially correspond to those of the second embodiment in accordance with FIG. 5*a*, 5*b*, where instead of the control and regulation of the hydraulic pressure cushions 15 mentioned there the hydraulic bed cushions 90 are used.

Figure 11:
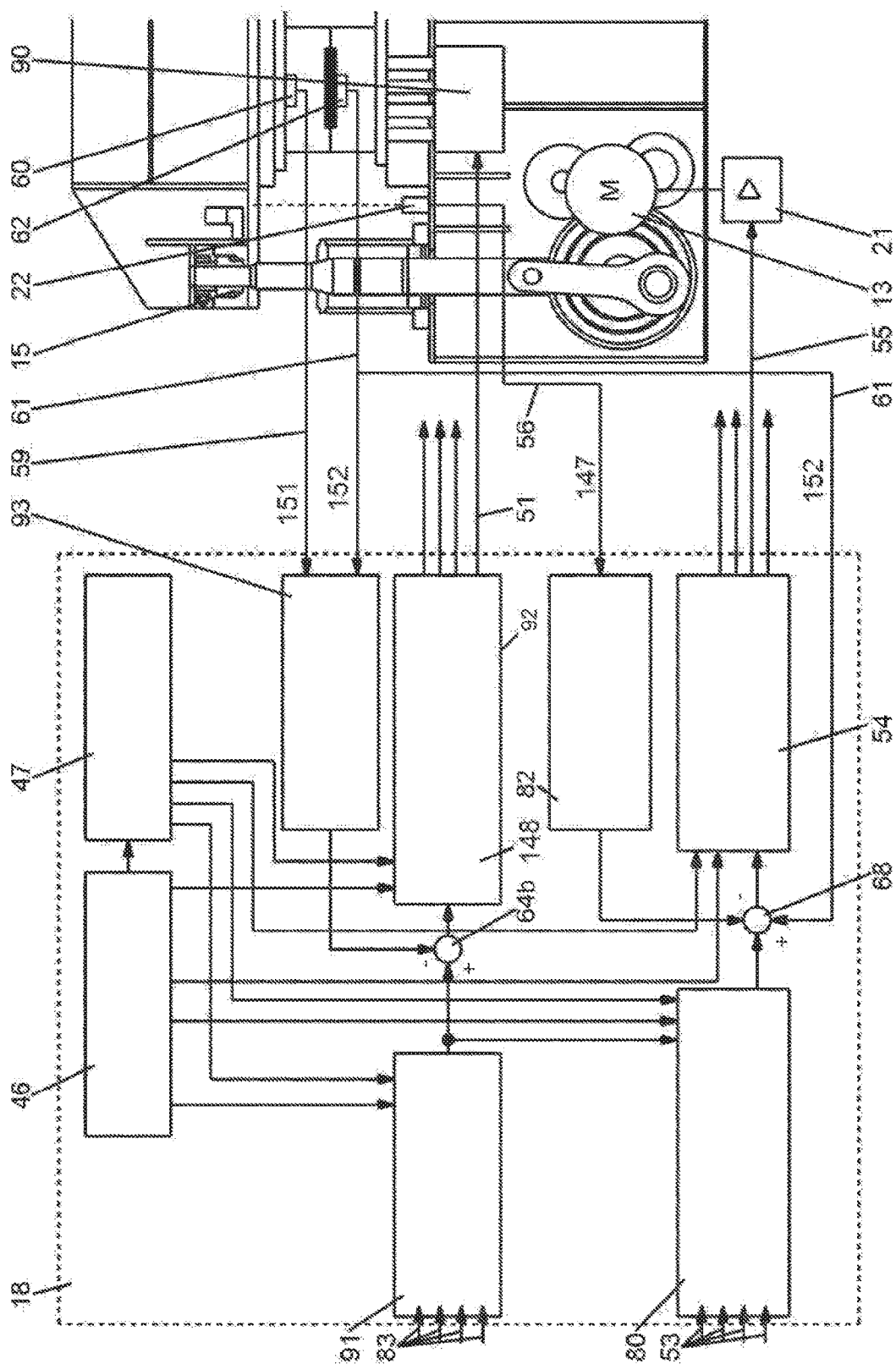
FIG. 11 shows a block diagram of the control features of the device according to the fourth embodiment of the present invention.

FIG. 11 shows the control technology device features of the NC control device 18 corresponding to the fourth embodiment as a block diagram.

Compared to the block diagram for the second embodiment depicted in FIG. 6, the differences are that the functional unit for the force control of the hydraulic bed cushions 92 is linked with the sequential control 46 on the one hand and with the functional unit to calculate the cushion-specific curves of the target force values 91 via the force sum value 64*b* on the other.

The further input value of the force sum value 64 originates from the functional unit 93 for the calculation of the cushion-specific force correction values 63.

The functional unit 92 for the force control of the hydraulic bed cushions provides the reference value signals 51 to control each of the hydraulic bed cushions 90.

While in the above-described embodiments the tilt and/or the draw depth of the ram which are influenced by asymmetric loading is compensated or specifically influenced by applying a mutually different path profile to the servo motors 13 which can be controlled with feed-back or with open-loop control independently of each other, the hydraulic pressure cushions in the ram drive influence the tilt position in the fifth and sixth embodiment.

The schematic setup of these following embodiments below corresponds to FIG. 7.

Figure 12:
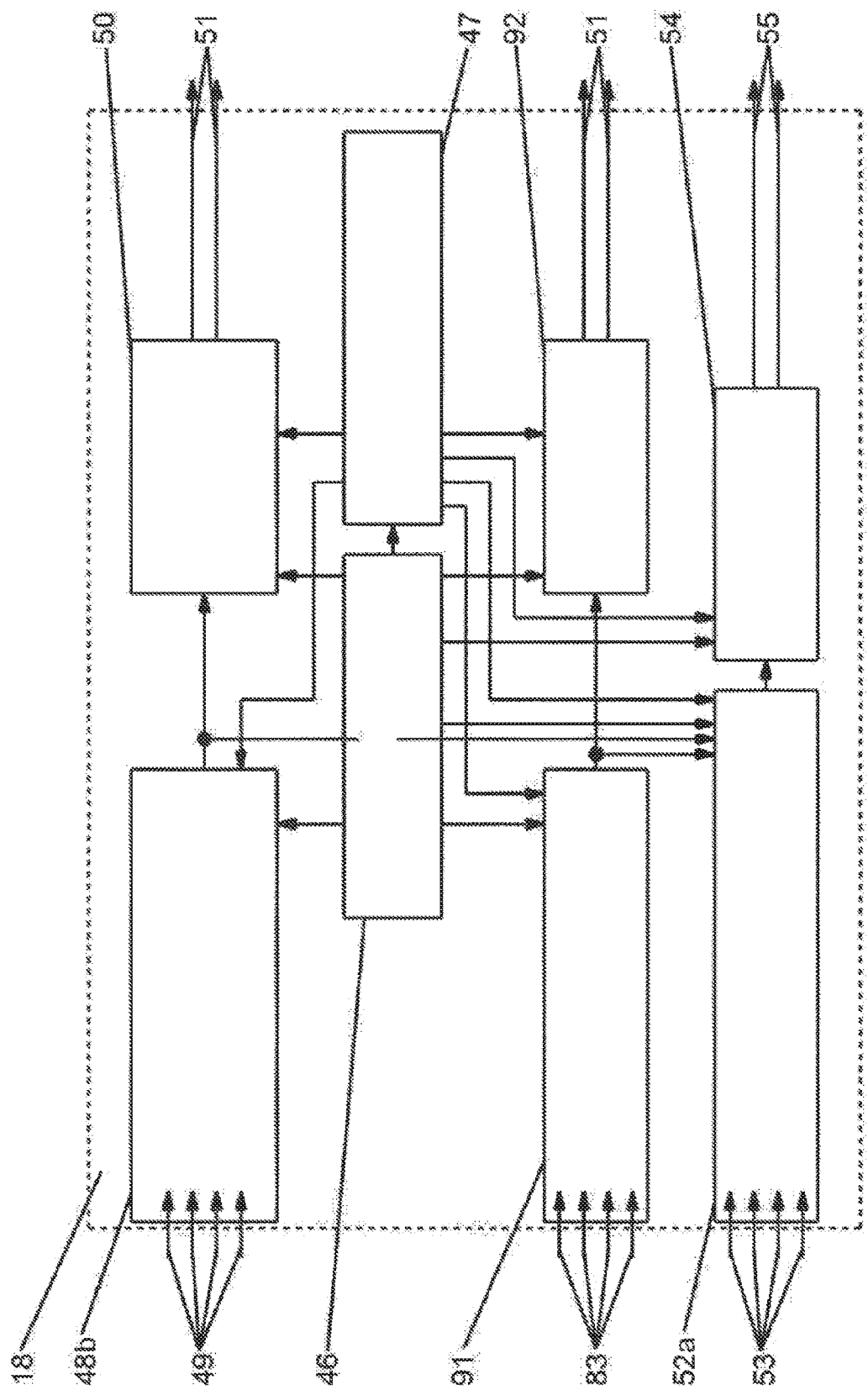
FIG. 12 shows a block diagram of the control features of the device according to the fifth embodiment of the present invention.

FIG. 12 shows the control technology device features of the NC control device 18 for the fifth embodiment as a block diagram.

Compared to the exemplary embodiments described in FIG. 2 and FIG. 8, the functional unit to control the force of the hydraulic pressure cushions 50 and the functional unit to control the force of the hydraulic bed cushions 92 are used in combinatory interaction.

The sequential control 46 simultaneously coordinates the functional unit for the calculation of the pressure-point specific curves of the target force values "with correction" 48*b* and its functional unit to control the force of the hydraulic pressure cushions 50 on the one hand, and the functional unit to calculate the cushion-specific curves of the target force values 91 and its functional unit to control the force of the hydraulic bed cushions 92 and the functional unit to calculate the target position curves for the pressure points of the ram 52*a* and its functional unit for the position control of the pressure points of the ram 54, on the other.

Figure 13A:
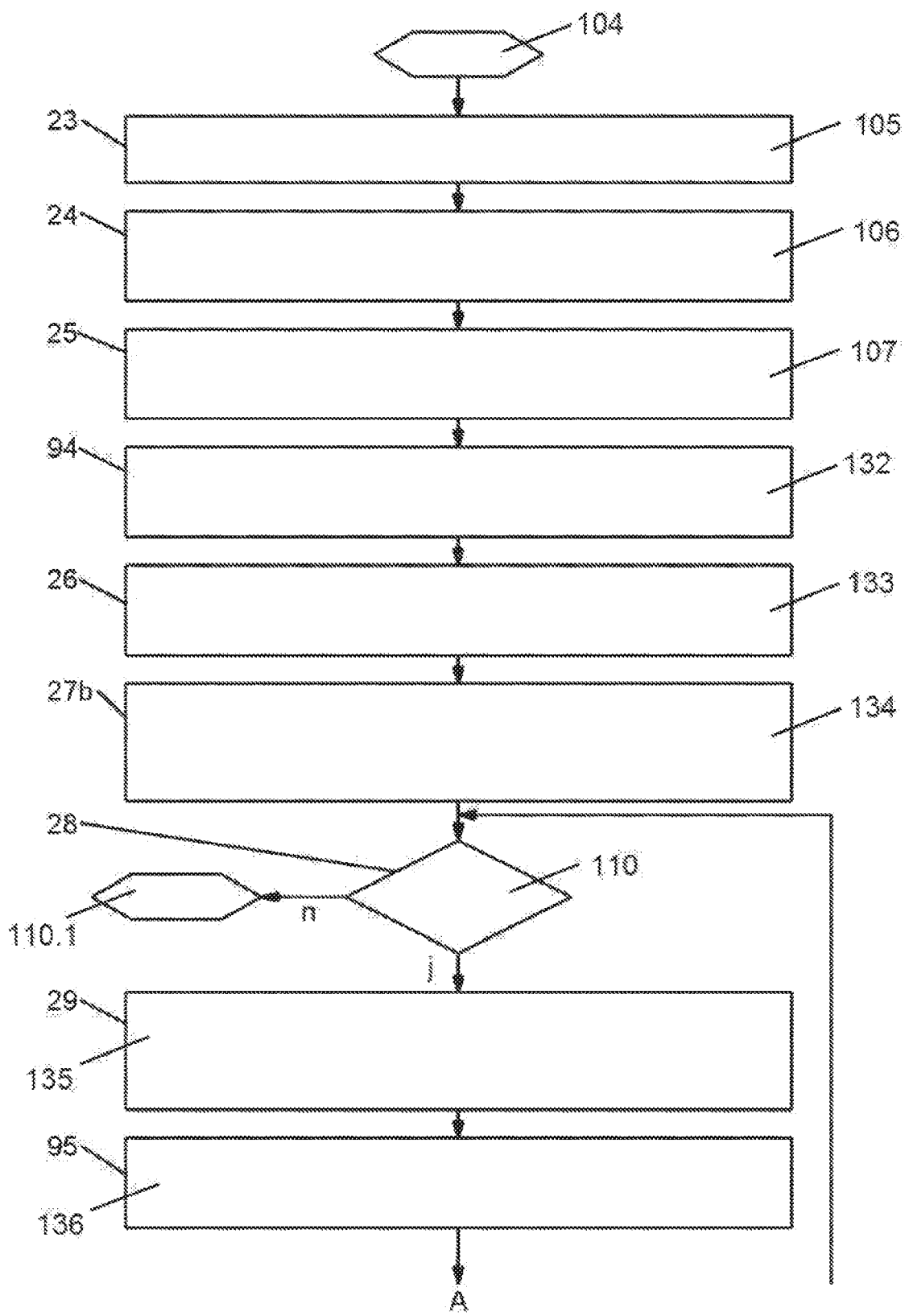
FIG. 13a shows a sequence of steps of the method with influencing of the tilt position of the ram as a result of a variable force being applied to the die segments according to the fifth embodiment of the present invention according to the "open-loop controlled, static" type.
Figure 13B:
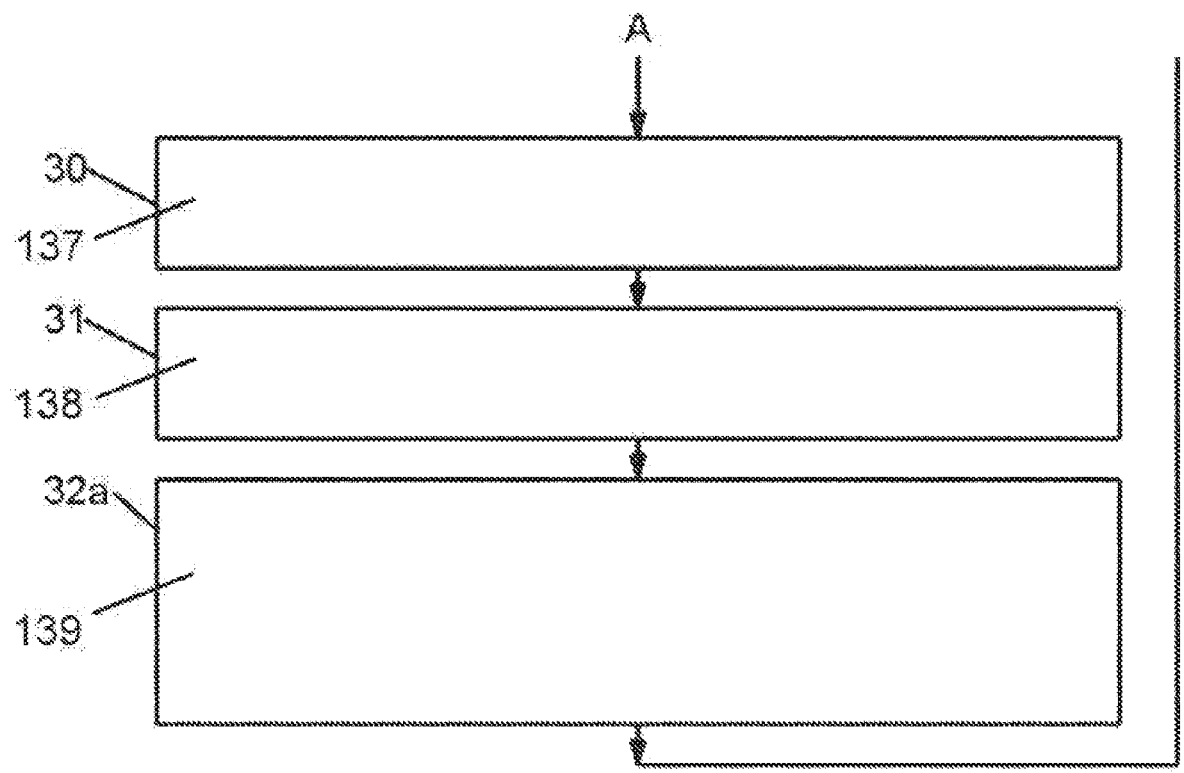
FIG. 13b shows a sequence of steps of the method with influencing of the tilt position of the ram as a result of a variable force being applied to the die segments according to the fifth embodiment of the present invention according to the "open-loop controlled, static" type.

FIG. 13*a*, 13*b* depicts the proposed method for a fifth advantageous embodiment in the form of a sequence of steps of the "open-loop controlled, static" type with cushion-specific force control of the die segments 17 and tilt compensation of the ram 4 by controlling the force of the hydraulic pressure cushion 15.

Compared to the chain of steps described in FIG. 3, the curves of the cushion-specific target force values for the hydraulic bed cushions 90 which are specific to the multiple pressed parts 16.1, 16.2 are generated in addition in the fourth preparatory phase 94.

In the subsequent fifth preparatory phase 26, the asymmetric cushioning values of the adjacent pressure points 6, 7 and 8, 9 are calculated using the parameters saved in step V1 and V4.

In the sixth preparatory phase 27*b*, a curve of pressure point-specific target force values with correction for the hydraulic pressure cushion 15 is calculated on the basis of the parameters generated in the preparatory phase 26 and saved in the NC control device 18.

After the start signal 28, the sequence of method steps differs from the sequence according to FIG. 3 in that, in the second method step 95, the target force values generated in the fourth preparatory step 94 are used to be applied to the hydraulic bed cushions 90.

Figure 14A:
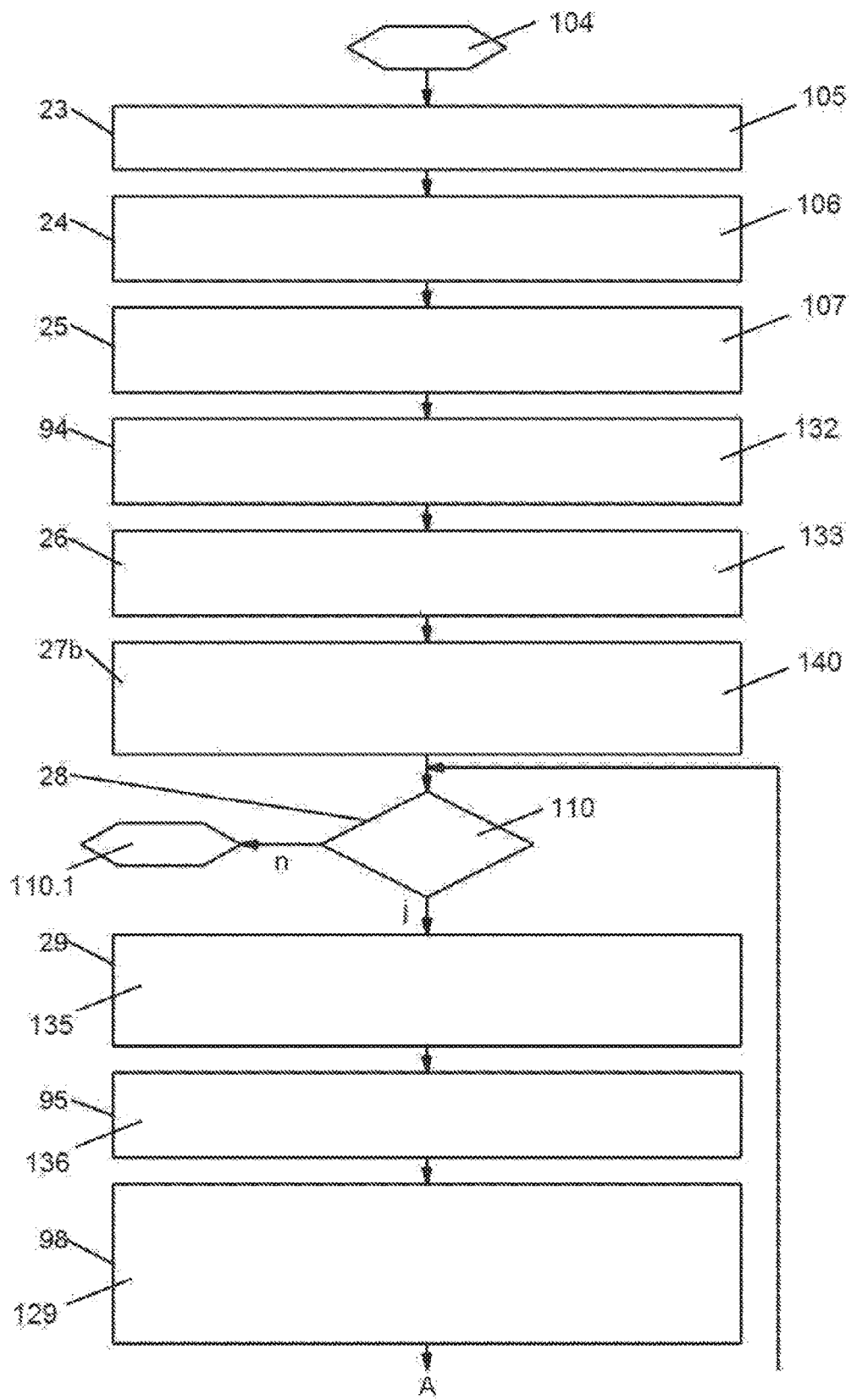
FIG. 14a shows a sequence of steps of the method with influencing of the tilt position of the ram as a result of a variable force being applied to the die segments according to the sixth embodiment of the present invention according to the "controlled, dynamic" type.
Figure 14B:
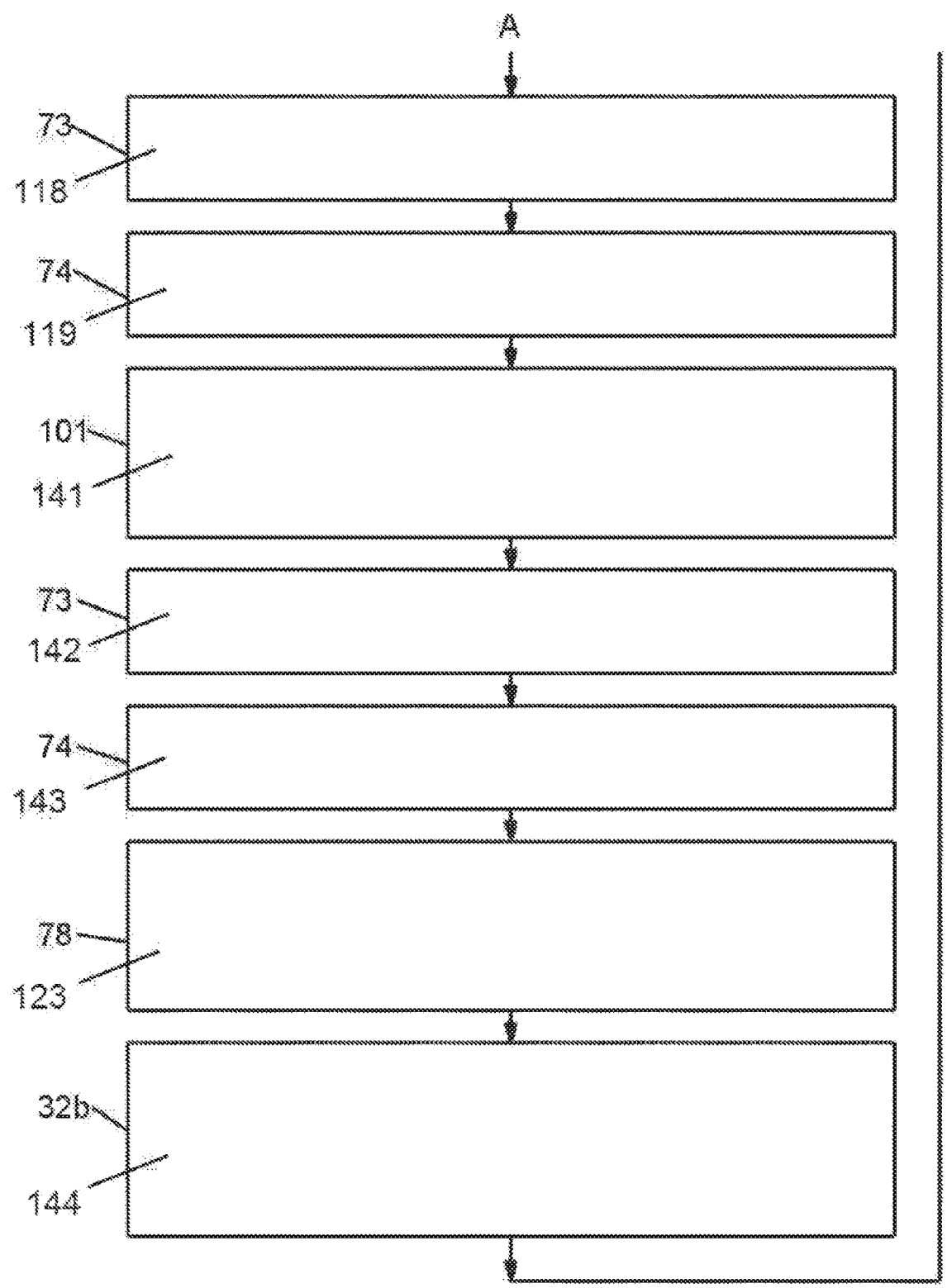
FIG. 14b shows a sequence of steps of the method with influencing of the tilt position of the ram as a result of a variable force being applied to the die segments according to the sixth embodiment of the present invention according to the "controlled, dynamic" type.
Figure 15:
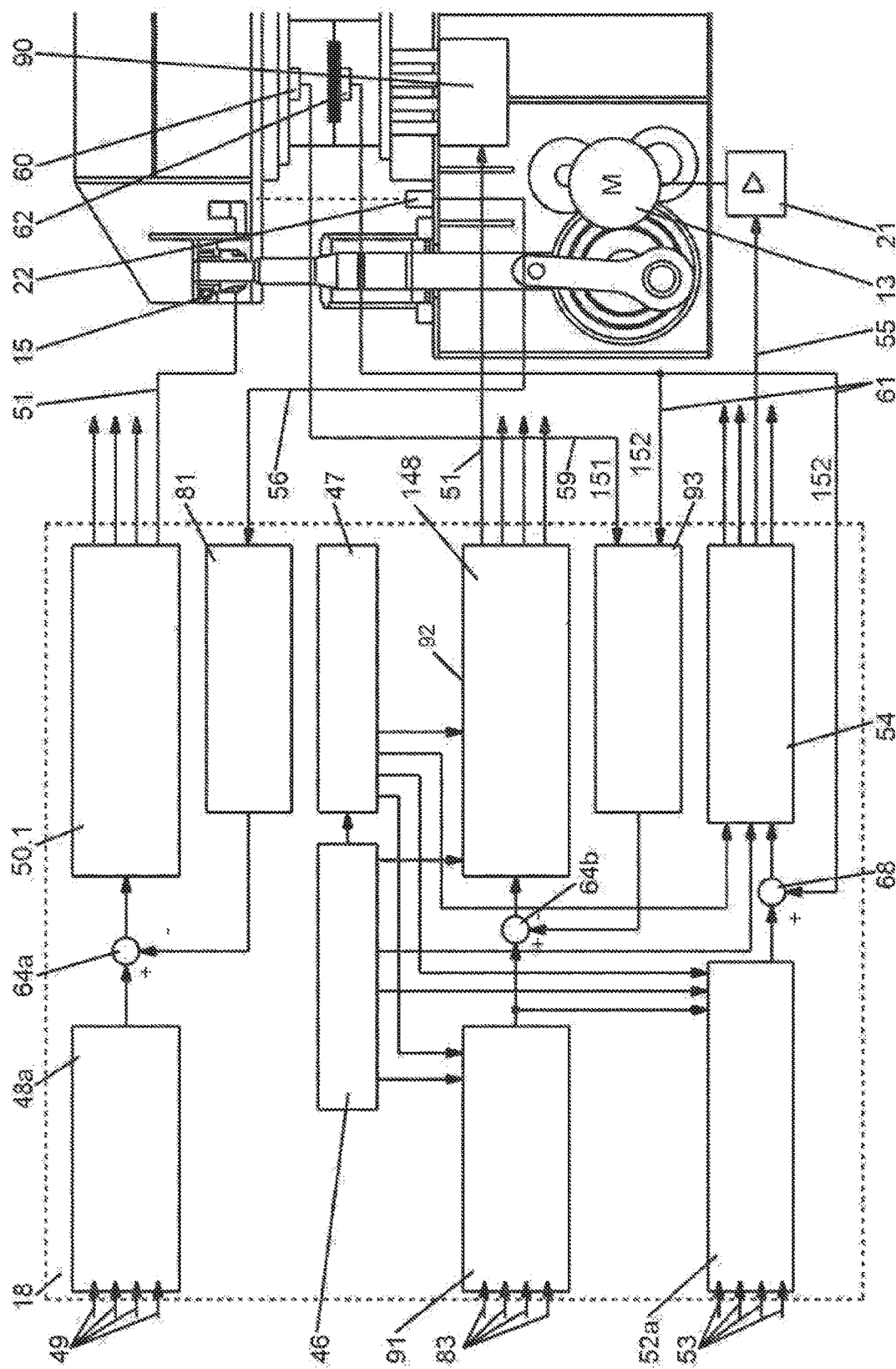
FIG. 15 shows a block diagram of the control features of the device according to the sixth embodiment of the present invention.

The step sequence of the method with influencing of the tilt position and draw depth of the ram 4 according to a sixth embodiment of the "controlled, dynamic" type can be seen from FIG. 14a, 14b.

Compared to the above-described fifth embodiment, the force control in the hydraulic bed cushions 90 in combination with the influencing of the tilt position and draw depth of the ram 4 can all be conducted dynamically by the hydraulic pressure cushions 15.

Up to the second method step 95, the sequence is the same as in the fifth embodiment according to FIG. 13a, 13b.

During the closed phase 35 of the ram 4, the curve of the actual process force 59 of each die segment 17 is recorded by means of force sensor 60 on the one hand, and the curve of the actual process temperature 61 by means of temperature sensor 62 on the other, in the third method step 98. These are used to calculate a cushion-specific force correction value 63 with which together with the curve of the cushion-specific target force value, a force sum value 64b is calculated in the fourth method step 73. In the fifth method step 74, the corrected target pressure values 102 for the servo valves 103 for the control of the force control loop of the hydraulic bed cushions 90 are formed.

During the closed phase 35 in the sixth method step 101, the curves of the pressure point-specific actual cushioning are recorded simultaneously by means of the ram position measurement devices 22, whose measurand signals 56 are used to calculate the pressure point-specific force correction values 63. After the pressure point-specific values for the target force and the force correction have been summed in the seventh method step 73, the target pressure values 65 for the servo valves 66 to control the force of the hydraulic pressure cushions 15 are calculated and output in the eighth method step 74.

The end of the closed phase 35 is initiated as a function of time in accordance with the actual temperature 61 measured in the die segments 17 or pressed parts 16 in the ninth method step 78.

In the tenth method step 32b, after being at rest at the bottom dead center the upward movement of the ram 4 is initiated into the starting position of the top dead center and a switch-over to the first target force value is open-loop controlled in the hydraulic pressure cushions 15.

After the fully formed pressed parts 16 have been removed and the heated blanks have been fed in again, the next cycle starts with the same sequence.

The present invention is not limited to embodiments described herein; reference should be had to the appended claims.

LIST OF REFERENCE NUMERALS 1 press bed
2 bottom die
3 drive
4 ram
5 top die
6,(7),8,(9) pressure point
10 pull rod
11,11.1,11.2,(11.3,11.4) cam gear
12.1,12.2,(12.3,12.4) connecting rod
13,13.1,(13.2),13.3,(13.4) servo motor
14 adjustment gear
15,15.1,15.2,(15.3,15.4) hydraulic pressure cushion
16 pressed part
16.1,16.2,(16.3,16.4) multiple pressed parts
17,17.1,17.2,(17.3,17.4) die segments
18 NC control
21,21.1,21.2,(21.3,21.4) converter
22.1,22.2,(22.3,22.4) ram position measurement device
23 first preparatory phase
24 second preparatory phase
25 third preparatory phase of the first, second, fifth and sixth embodiment
26 fourth preparatory phase
27a fifth preparatory phase of the first and third embodiment
27b fifth preparatory phase of the fifth and sixth embodiment
28 start signal
29 first method step of the first, third, fifth and sixth embodiment
30 second method step of the first, second and fifth embodiment
31 third method step of the first and fifth embodiment
32a fourth method step of the first and fifth embodiment
32b fourth method step of the sixth embodiment
33 position curve of the pressure points 6,7
34 position curve of the pressure points 8,9
35 closed phase of the die
36 first phase with positional control
37 second phase with force control
38 third phase with positional control
39 first target force value in the pressure cushions 15.1, 15.2,15.3,15.4
40 force curve in the pressure cushions 15.1,15.2 during the closed phase 35
41 force curve in the pressure cushions 15.3,15.4 during the closed phase 35
42 second target value of the force in the pressure cushions 15.1,15.2,15.3,15.4
43 uncompensated curve of the tilt position of the ram with active force control
44 compensated curve of the tilt position of the ram without active force control
45 compensated curve of the tilt position of the ram with active force control
46 sequential control
47 storage device for machine and die data
48a functional unit to calculate the pressure point-specific curves of the target value of the force
48b functional unit to calculate the pressure point-specific curves of the target value of the force with correction
49 signal values to determine the target values of the pressure point-specific force
50 functional unit for the force control of the hydraulic pressure cushions
50.1 functional unit for the force control of the hydraulic pressure cushions (target value of pressure 65 to servo valves 66)
51 reference value signals for the control of the hydraulic pressure cushions
52a functional unit to calculate the target position curves for the pressure points of the ram
52b functional unit to calculate the target position curves for the pressure points of the ram with correction 53 signal values to determine the target position curves for the pressure points of the ram
54 functional unit for the position control for the pressure points of the ram
55 reference value signals for the pressure point-specific servo motors
56 measurand signals of the ram position measuring devices
57 electronic positional cam profile
58 difference in position of the pressure points
59 measurand signals for the curves of the actual process force
60 force sensor
61 measurand signals for the curves of the actual process temperature
62 temperature sensor
63 force correction value
64a, b sum value of force
65 target value of pressure of hydraulic pressure cushions
66 servo valves of the hydraulic pressure cushions
67 positional offset
68 sum value of position
70 fifth preparatory phase of the second and fourth embodiment
71 first method step of the second and fourth embodiment
72 third method step of the second embodiment
73 fourth method step of the second, fourth and sixth embodiment
74 fifth method step of the second, fourth and sixth embodiment
75 sixth method step of the second and fourth embodiment
76 seventh method step of the second and fourth embodiment
77 eighth method step of the second and fourth embodiment
78 ninth method step of the second and sixth embodiment
79 tenth method step of the second embodiment
80 functional unit to calculate the pressure point-specific target position curves with initial correction values
81 functional unit to calculate the correction values of the pressure point-specific force 63
82 functional unit to calculate the pressure point-specific positional offset 67
83 signal values to determine the target values of the cushion-specific force
90 (90.1,90.2,90.3,90.4) process cushion, (multi-point bed cushion)
91 functional unit to calculate the target value curves of the cushion-specific force
92 functional unit for the force control of the hydraulic bed cushions
93 functional unit to calculate the correction values of the cushion-specific force 63
94 third preparatory stage of the third, fourth, fifth and sixth embodiment
95 second method step of the third, fourth, fifth and sixth embodiment
96 third method step of the third embodiment
97 fourth method step of the third embodiment
98 third method step of the fourth and sixth embodiment
99 ninth method step of the fourth embodiment
100 tenth method step of the fourth embodiment
101 sixth method step of the sixth embodiment
102 target pressure values of the hydraulic bed cushions
103 servo valves of the hydraulic pressure cushions
104 start
105 V1: Save the machine-specific stiffness values
106 V2: Input and calculate the positional cam profile for the ram movement
107 V3: input or learning stroke of the pressure point-specific curve of the target force value for the hydraulic pressure cushions
108 V4: calculation from step V1 and V3 or learning stroke of the asymmetric cushioning values of the adjacent pressure points
109 V5: calculation of the pressure point-specific target curves with correction from step V2 and V4 as a pressure point-specific positional cam profile with saving in the NC control
110 Start the press?
110.1 End
111 S1: Start cycle of the ram movement (reciprocating movement). Top dead center 4 at rest at the bottom dead center. Positional control of the pressure point-specific servo motors with positional cam profile with correction
112 S2:→Start closed phase at the bottom dead center set curve of the target force value of the hydraulic pressure cushions from V3
113 S3:→End closed phase at the bottom dead center set hydraulic pressure cushions to the second target value of the force from V3
114 S4: At rest at the bottom dead center-→top dead center (reciprocating movement).
Positional control of the servo motors according to the positional cam profile with correction
set hydraulic pressure cushions to the first target value of the force from V3
115 V5: Calculation of the pressure point-specific curves of the target position with initial correction values from step V2 and V4 as pressure point-specific positional cam profile with saving in the NC control
116 S1: Start cycle of the ram movement (reciprocating movement). Top dead center→at rest at the bottom dead center; positional control of the pressure point-specific servo motors with positional cam profile with initial correction values
117 S3:→closed phase at the bottom dead center;
measurement of the curve of the pressed part-specific actual process force
actual temperature
Calculation of the pressure point-specific force correction value
118 S4:→closed phase at the bottom dead center;
summation of curve of the target force value and force correction value
119 S5:→closed phase at the bottom dead center
calculation and output of the target pressure values for the servo valves in accordance with the sum value
120 S6:→Closing phase at the bottom dead center
Measurement of the curve of the actual pressure point-specific cushioning
calculation of the pressure point-specific positional offset
121 S7:→Closing phase at the bottom dead center;
summation of the pressure point-specific target position curves with initial correction values and pressure point-specific positional offsets
122 S8:→Closing phase at the bottom dead center;
positional control of the pressure point-specific servo motors in accordance with sum value 123 S9:→End closed phase at the bottom dead center
time specific in accordance with pressed part temperature from actual value feedback
set hydraulic pressure cushions to the second target value of the force from V3

124 S10: Closing phase at the bottom dead center→top dead center (reciprocating movement).
Positional control of the servo motors according to the positional cam profile with initial correction value
set hydraulic pressure cushions to the first target value of the force from V3

125 V3: Input or learning stroke of the cushion-specific curve of the target force value for the hydraulic bed cushions 126 S2:→Start closed phase at the bottom dead center
set curve of the target force value of the hydraulic bed cushions from V3

127 S3→End closed phase at the bottom dead center
set hydraulic bed cushions to the second target value of the force from V3

128 S4: At rest at the bottom dead center→top dead center (reciprocating movement).
Positional control of the servo motors according to the positional cam profile with correction
set hydraulic bed cushions to the first target value of the force from V3

129 S3:→closed phase at the bottom dead center;
measurement of the curve of the actual pressed part-specific
process force
temperature; calculation of the cushion-specific force correction value 130 S9:→End closed phase at the bottom dead center
time specific in accordance with pressed part temperature from actual value feedback
set hydraulic bed cushions to the second target value of the force from V3

131 S10: Closing phase at the bottom dead center→top dead center (reciprocating movement).
positional control of the servo motors according to the positional cam profile with initial correction value
set hydraulic bed cushions to the first target value of the force from V3

132 V4: Input or learning stroke for the cushion-specific curve of the target force value for the hydraulic bed cushions 133 V5: Calculation from step V1 and V3; learning stroke of asymmetric cushioning values of adjacent pressure points 134 V6: Calculation of the pressure point-specific curves of the target force with correction from step V5 for the hydraulic pressure cushions with saving in the NC control 135 S1: Start the ram movement cycle. Top dead center→at rest at the bottom dead center; positional control of the pressure point-specific servo motors with positional cam profile 136 S2:→Start closed phase at the bottom dead center
control curve of the target force value of the hydraulic bed cushions from V4

137 S3:→closed phase at the bottom dead center
control curve of the target force value of the hydraulic pressure cushions from V3

138 S4:→End closed phase at the bottom dead center
set hydraulic pressure cushions to the second target value of the force from V3

139 S5: At rest at the bottom dead center→top dead center
positional control of the servo motors according to positional cam profile
set hydraulic pressure cushions to the first target value of the force from V3

140 V6: calculation of the pressure point-specific curves of the target force with initial correction values from step V5 for the hydraulic pressure cushions with saving in the NC control 141 S6:→closed phase at the bottom dead center
measurement of the curve of the pressure point-specific actual cushioning
calculation of the pressure point-specific force correction values 142 S7:→Closing phase at the bottom dead center;
summation of the pressure point-specific target force values and force correction values 143 S8:→Closing phase at the bottom dead center;
calculation and output of the target pressure values for the servo valves in accordance with the sum value 144 S10: At rest at the bottom dead center→top dead center
positional control of the servo motors according to positional cam profile
set hydraulic pressure cushions to the first target value of the force from V3

145 positional control with electronic positional cam profile 57

146 curve of the tilt position (uncompensated, compensated) of the ram 147 actual cushioning 148 force control of the hydraulic bed cushions (target value of pressure 102 to servo valves 103)

149 force control 150 force curve in the hydraulic pressure cushions 151 actual force 152 actual temperature

What is claimed is:

1. A method for a control of a ram movement and of ram forces of a multi-point servo hybrid press,
wherein the multi-point servo hybrid press comprises,
a ram which is configured to move vertically, the ram comprising pressure points each of which comprises a hydraulic pressure cushion, the pressure points comprising a first pressure point or a first pressure point group and a second pressure point or a second pressure point group,
at least two servo motors each of which is configured to provide a rotational movement, the at least two servo motors comprising a first servo motor which is assigned to the ram and to the first pressure point or to the first pressure point group and a second servo motor which is assigned to the ram and to the second pressure point or to the second pressure point group,
at least two cam gears, the at least two cam gears comprising a first cam gear and a second cam gear, the first cam gear being configured to convert the rotational movement of the first servo motor into a linear movement, and the second cam gear being configured to convert the rotational movement of the second servo motor into a linear movement,
at least two pull rods, the at least two pull rods comprising a first pull rod and a second pull rod, the first pull rod being operatively connected to the first cam gear and being configured to be provided with the linear movement so as to drive the ram via the first pressure point or via the first pressure point group, and the second pull rod being operatively connected to the second cam gear and being configured to be provided with the linear movement so as to drive the ram via the second pressure point or via the second pressure point group, a press bed, a bottom die arranged on the press bed, a top die operatively connected to the ram, and at least one process cushion arranged in at least one of the ram, the press bed, the bottom die, and the top die, wherein, the at least two servo motors are assigned to the pressure points of the ram for a main drive for the ram movement, the method comprising controlling, independently of each other:

as a main function, a position, a speed and a force of the main drive for the ram movement to drive the ram via the pressure points of the ram assigned to the at least two servo motors; and at least one of as a first auxiliary function, each hydraulic pressure cushion of the pressure points of the ram, and, as a second auxiliary function, the at least one process cushion, so as to influence a process-induced position and a force setting of the ram in a combinatory interaction so as to achieve an active control of a penetration depth and a tilt.

2. The method as recited in claim 1, wherein the method is used to produce a warm-formed pressed part.

3. The method as recited in claim 1, wherein, the multi-point servo hybrid press further comprises, an NC control device which is configured to control the at least one process cushion, the NC control device comprising a positional cam profile which is configured to control at least one of a position, a speed, a torque and a force of each of the at least two servo motors for driving the pressure points of the ram, the positional cam profile being controlled by a virtual control shaft, and a positional control which is configured to influence a position of each of the pressure points, and the method further comprises:

storing machine-specific stiffness values in the NC control device, in a first preparatory phase;

inputting, calculating and storing part-specific target curve values for a movement of the pressure points of the ram without correction in the NC control device as the positional cam profile, in a second preparatory phase;

inputting or recording and storing a part-specific target curve and a cushion-specific curve of a target force value during the ram movement and in a closed phase of the ram for the at least one process cushion via a learning stroke in the NC control device as pressure point-specific force values, in a third preparatory phase;

calculating and storing asymmetric cushioning values of the first pressure point group and of the second pressure point group from the machine-specific stiffness values from the first preparatory phase and the pressure point-specific force values from the third preparatory phase in the NC control device, or determining and storing the asymmetric cushioning values via the learning stroke in the NC control device, in a fourth preparatory phase;

calculating and storing a pressure point-specific target curve with a correction from the part-specific target curve values from the second preparatory phase and the asymmetric cushioning values from the fourth preparatory phase, in each case, for the ram movement, as the positional cam profile assigned to the pressure points with correction in the NC control device, in a fifth preparatory phase;

starting the ram movement, generating the virtual control shaft for a pressing cycle, influencing a position of the first servo motor assigned to the first pressure point group and a position of the second servo motor assigned to the second pressure point group via the positional control which receives a target value from the positional cam profile with a correction as read out by the virtual control shaft, and setting the at least one process cushion to a first target force value, in a first method step;

executing, at a start of the closed phase of the ram, a switch-over to a force control via the at least one process cushion in accordance with the cushion-specific curve of the target force value of the third preparatory phase, in a second method step;

setting, at an end of the closed phase of the ram, a pressure in the at least one process cushion to a second target force value to retract the ram under a load, in a third method step; and initiating an upwards movement of the ram in accordance with the positional control based on the positional cam profile with the correction and, with a continued ram movement towards a top dead center, setting the pressure in the at least one process cushion to the first target value of a force for a subsequent pressing process, and continuing a movement sequence in a cycle with the first method step, in a fourth method step.

4. The method as recited in claim 1, wherein, the multi-point servo hybrid press further comprises, an NC control device which is configured to control the at least one process cushion, the NC control device comprising a positional cam profile which is configured to control at least one of a position, a speed, a torque and a force of each of the at least two servo motors for driving the pressure points of the ram, the positional cam profile being controlled by a virtual control shaft, a force sensor configured to detect an actual process force, a temperature sensor configured to detect an actual process temperature, a servo or proportional valve for the at least one process cushion, ram position measurement devices which are configured to measure a position of the ram, and a positional control which is configured to influence a position of each of the at least two servo motors, wherein, the bottom die comprises die segments, and the at least one process cushion is provided as a hydraulic bed cushion, and the method further comprises:

storing machine-specific stiffness values in the NC control device, in a first preparatory phase;

inputting, calculating and storing part-specific target curve values for a movement of the pressure points of the ram without correction in the NC control device as the positional cam profile without correction, in a second preparatory phase;

inputting or recording and storing a part-specific target curve and a cushion-specific curve of a target force value during the ram movement and in a closed phase of the ram for the hydraulic bed cushions via a learning stroke in the NC control device as cushion-specific force values, in a third preparatory phase;

calculating and storing asymmetric cushioning values of the first pressure point group and of the second pressure point group from the machine-specific stiffness values from the first preparatory phase and the cushion-specific force values from the third preparatory phase in the NC control device, or determining and storing the asymmetric cushioning values via the learning stroke in the NC control device, in a fourth preparatory phase;

calculating and storing a pressure point-specific target curve with initial correction values from the part-specific target curve values without correction from the second preparatory phase and the asymmetric cushioning values from the fourth preparatory phase, in each case, for the ram movement, as the positional cam profile assigned to the pressure points with the initial correction values in the NC control device, in a fifth preparatory phase;

starting the ram movement, generating the virtual control shaft for a pressing cycle, influencing a position of the first servo motor assigned to the first pressure point group and of the second servo motor assigned to the second pressure point group via the positional control which receives a target value from the positional cam profile with an initial correction as read out by the virtual control shaft, and setting the at least one process cushion to a first target force value, in a first method step;

executing, at a start of a closed phase of the ram, a switch-over to a force control via the at least one process cushion in accordance with the cushion-specific curve of the target force value from the third preparatory phase, in a second method step;

calculating, during the closed phase of the ram, a cushion-specific force correction value based on a curve of the actual process force detected by the force sensor and a curve of the actual process temperature detected by the temperature sensor, in a third method step;

forming a force sum value from the part-specific target curve and the cushion-specific curve of the target force value for the hydraulic bed cushions with the cushion-specific force correction value, in a fourth method step;

calculating target pressure values from the force sum value and outputting the target pressure values to the servo or proportional valve for the hydraulic bed cushions, in a fifth method step;

during the closed phase of the ram, calculating a pressure point-specific positional offset from measured signals of the ram position measurement devices for each of the pressure points, in a sixth method step;

during the closed phase of the ram, forming a position sum value from a pressure point-specific curve of a target position with an initial correction value and a pressure point-specific positional offset, in a seventh method step;

influencing a position of each of the pressure points via the positional control and the target correction value received from the positional cam profile as read out by the virtual control shaft with a position sum value, in an eighth method step;

finishing the closed phase of the ram as a function of time in accordance with the actual process temperature measured in the die segments or in pressed parts, and setting a pressure in the hydraulic bed cushions to a second target force value to retract the ram under a load, in a ninth method step; and initiating an upwards movement of the ram in accordance with the positional control via the positional cam profile with an initial correction value and with a continued movement of the ram towards a top dead center, setting the pressure in the hydraulic bed cushions to the first target force value for a subsequent pressing process, and continuing a movement sequence in a cycle with the first method step, in a tenth method step.

5. The method as recited in claim 1, wherein,
the multi-point servo hybrid press further comprises,
an NC control device which is configured to control the at least one process cushion, the NC control device comprising a positional cam profile which is configured to control at least one of a position, a speed, a torque and a force of each of the at least two servo motors for driving the pressure points of the ram, the positional cam profile being controlled by a virtual control shaft, and
a positional control which is configured to influence a position of each of the pressure points, and
the method further comprises:
storing machine-specific stiffness values in the NC control device, in a first preparatory phase;
inputting, calculating and storing in the NC control device as the positional cam profile part-specific target curve values for a movement of the pressure points of the ram, in a second preparatory phase;
inputting or recording and storing in the NC control device a part-specific curve of a target force value and a pressure point-specific curve of the target force value during the ram movement and in a closed phase of the ram for the hydraulic pressure cushions in the pressure points via a learning stroke as pressure point-specific force values, in a third preparatory phase;
inputting or recording and storing in the NC control device a part-specific curve of the target force value and a cushion-specific curve of the target force value during the ram movement and in the closed phase of the ram for the at least one process cushion via the learning stroke, in a fourth preparatory phase;
calculating asymmetric cushioning values of the first pressure point group and of the second pressure point group from the machine-specific stiffness values of the first preparatory phase and the pressure point-specific force values from the third preparatory phase, or determining the asymmetric cushioning values via the learning stroke, and storing the asymmetric cushioning values in the NC control device, in a fifth preparatory phase;
calculating a pressure point-specific curve of a target force with a correction for each hydraulic pressure cushion from the asymmetric cushioning values determined in the fifth preparatory phase and stored in the NC control device, in a sixth preparatory phase;

starting the ram movement, generating the virtual control shaft for a pressing cycle, influencing a position of the first servo motor assigned to the first pressure point group and of the second servo motor assigned to the second pressure point group via the positional control which receives a target value from the positional cam profile as read out by the virtual control shaft, and setting each hydraulic pressure cushion to a first target value of a force, in a first method step;

executing, at a start of a closed phase of the ram, a switch-over to a force control via the at least one process cushion based on the cushion-specific curve of the target force value from the fourth preparatory phase, in a second method step;

executing, in the closed phase of the ram, the switch-over to the force control via each hydraulic pressure cushion of the pressure points based on the pressure point-specific curve of the target force value generated in the third preparatory phase, in a third method step;

setting, at an end of the closed phase of the ram, a pressure in each hydraulic pressure cushion of the pressure points to a second target value of the force to retract the ram under a load, in a fourth method step; and initiating an upwards movement of the ram in accordance with the positional control based on the position cam profile and with a continued movement of the ram towards a top dead center, setting the pressure in each hydraulic pressure cushion of the pressure points to the first target value of the force for a subsequent pressing process, and continuing a movement sequence in a cycle with the first method step, in a fifth method step.

6. The method as recited in claim 1, wherein, the at least one process cushion of the second auxiliary function is arranged in the ram.

7. The method as recited in claim 1, wherein the at least one process cushion of the second auxiliary function is arranged in the top die.

8. A device to control a ram movement and of ram forces of a servo-electric warm-forming machine, the servo-electric warm-forming machine comprising:
a multi-point servo hybrid press comprising,
a ram which is configured to move vertically, the ram comprising pressure points each of which comprises a hydraulic pressure cushion, the pressure points comprising a first pressure point or a first pressure point group and a second pressure point or a second pressure point group,
at least two servo motors each of which is configured to provide a rotational movement, the at least two servo motors comprising a first servo motor which is assigned to the ram and to the first pressure point or to the first pressure point group and a second servo motor which is assigned to the ram and to the second pressure point or to the second pressure point group,
at least two cam gears, the at least two cam gears comprising a first cam gear and a second cam gear, the first cam gear being configured to convert the rotational movement of the first servo motor into a linear movement, and the second cam gear being configured to convert the rotational movement of the second servo motor into a linear movement,
at least two pull rods, the at least two pull rods comprising a first pull rod and a second pull rod, the first pull rod being operatively connected to the first cam gear and being configured to be provided with the linear movement so as to drive the ram via the first pressure point or via the first pressure point group, and the second pull rod being operatively connected to the second cam gear and being configured to be provided with the linear movement so as to drive the ram via the second pressure point or via the second pressure point group,
a force sensor configured to detect an actual force value feedback, and
a temperature sensor configured to detect an actual temperature value feedback,
the device comprising:
an NC control device which is configured to control at least one of a position, a speed and a force of each hydraulic pressure cushion of the pressure points of the ram, the NC control device comprising:
a positional cam profile which is configured to control at least one of a position, a speed, a torque and a force of the at least two servo motors for driving the pressure points of the ram, the positional cam profile being controlled by a virtual control shaft;
a sequential control;
a storage device for machine and die data;
a first functional unit for calculating pressure point-specific curves of a target force value for each hydraulic pressure cushion;
a second functional unit for a force control of each hydraulic pressure cushion;
a third functional unit for calculating pressure point-specific curves of a target position with initial correction values;
a fourth functional unit for a position control of the pressure points of the ram as a main function;
a fifth functional unit for calculating pressure point-specific force correction values, input values of the fifth functional unit being measured signals of the actual force value feedback and the actual temperature value feedback, and output values of the fifth functional unit when summed together with output values of the first functional unit for calculating the pressure point-specific curves of the target force value determine input values into the second functional unit for the force control of each hydraulic pressure cushion; and
a sixth functional unit for calculating pressure point-specific positional offsets, input values of the sixth functional unit being measured signals of the actual force value feedback, and output values of the sixth functional unit when summed together with output values of the third functional unit for calculating the pressure point-specific curves of the target position with initial correction values and the actual temperature value feedback determine input values into the fourth functional unit for the positional control of the pressure points of the ram.

9. A device to control a ram movement and a ram force of a servo-electric warm-forming machine, the servo-electric warm-forming machine comprising:
a multi-point servo hybrid press comprising,
a ram which is configured to move vertically, the ram comprising pressure points each of which comprises a hydraulic pressure cushion, the pressure points comprising a first pressure point or a first pressure point group and a second pressure point or a second pressure point group, at least two servo motors each of which is configured to provide a rotational movement, the at least two servo motors comprising a first servo motor which is assigned to the ram and to the first pressure point or to the first pressure point group and a second servo motor which is assigned to the ram and to the second pressure point or to the second pressure point group, at least two cam gears, the at least two cam gears comprising a first cam gear and a second cam gear, the first cam gear being configured to convert the rotational movement of the first servo motor into a linear movement, and the second cam gear being configured to convert the rotational movement of the second servo motor into a linear movement, at least two pull rods, the at least two pull rods comprising a first pull rod and a second pull rod, the first pull rod being operatively connected to the first cam gear and being configured to be provided with the linear movement so as to drive the ram via the first pressure point or via the first pressure point group, and the second pull rod being operatively connected to the second cam gear and being configured to be provided with the linear movement so as to drive the ram via the second pressure point or via the second pressure point group, a press bed, a bottom die arranged on the press bed, a top die operatively connected to the ram, and a process cushion arranged in at least one of the ram, the press bed, the bottom die, and the top die, the device comprising:

an NC control device which is configured to control at least one of a position, a speed and a force of the process cushion for a second auxiliary function, the NC control device comprising:

a positional cam profile which is configured to control at least one of a position, a speed, a torque and a force of the at least two servo motors for driving the pressure points of the ram, the positional cam profile being controlled by a virtual control shaft;

a first functional unit for a sequential control;

a second functional unit to store machine and die data;

a third functional unit for calculating cushion-specific curves of a target force value for the process cushion;

a fourth functional unit for a force control of the process cushion;

a fifth functional unit for calculating target position curves for the pressure points of the ram with correction; and a sixth functional unit for a position control of the pressure points of the ram as a main function.

10. A device to control a ram movement and of ram forces of a servo-electric warm-forming machine, the servo-electric warm-forming machine comprising:

a multi-point servo hybrid press comprising, a ram which is configured to move vertically, the ram comprising pressure points each of which comprises a hydraulic pressure cushion, the pressure points comprising a first pressure point group and a second pressure point group, at least two servo motors each of which is configured to provide a rotational movement, the two servo motors comprising a first servo motor which is assigned to the ram and to the first pressure point group and a second servo motor which is assigned to the ram and to the second pressure point group, at least two cam gears, the at least two cam gears comprising a first cam gear and a second cam gear, the first cam gear being configured to convert the rotational movement of the first servo motor into a linear movement, and the second cam gear being configured to convert the rotational movement of the second servo motor into a linear movement, at least two pull rods, the at least two pull rods comprising a first pull rod and a second pull rod, the first pull rod being operatively connected to the first cam gear and being configured to be provided with the linear movement so as to drive the ram via the first pressure point group, and the second pull rod being operatively connected to the second cam gear and being configured to be provided with the linear movement so as to drive the ram via the second pressure point group, a press bed, a bottom die arranged on the press bed, a top die operatively connected to the ram, a process cushion arranged in at least one of the ram, the press bed, the bottom die, and the top die, a force sensor configured to detect an actual force value feedback, and a temperature sensor configured to detect an actual temperature value feedback, the device comprising:

an NC control device which is configured to control at least one of a position, a speed and a force of the process cushion for a second auxiliary function, the NC control device comprising:

a positional cam profile which is configured to control at least one of a position, a speed, a torque and a force of the at least two servo motors for driving the pressure points of the ram, the positional cam profile being controlled by a virtual control shaft;

a sequential control;

a storage device for machine and die data;

a first functional unit for calculating cushion-specific curves of a target force value for the process cushion;

a second functional unit for a force control of the process cushion;

a third functional unit for calculating pressure point-specific curves of a target position with initial correction values;

a fourth functional unit for a position control of the pressure points of the ram as a main function;

a fifth functional unit for calculating cushion-specific force correction values, input values of the fifth functional unit being measured signals of the actual force value feedback and the actual temperature value feedback, and output values of the fifth functional unit when summed together with output values of the first functional unit for calculating the cushion-specific curves of the target force value determine input values into the second functional unit for the force control of the process cushion; and a sixth functional unit for calculating pressure point-specific positional offsets, input values of the sixth functional unit being measured signals of the actual force value feedback, and output values of the sixth functional unit when summed together with the output values of the third functional unit for calculating the pressure point-specific curves of the target position with initial correction values and the actual temperature value feedback determine input values into the fourth functional unit for the positional control of the pressure points of the ram.

11. A device to control a ram movement and of ram forces of a servo-electric warm-forming machine, the servo-electric warm-forming machine comprising:
   a multi-point servo hybrid press comprising,
      a ram which is configured to move vertically, the ram comprising pressure points each of which comprises a hydraulic pressure cushion, the pressure points comprising a first pressure point group and a second pressure point group,
      at least two servo motors each of which is configured to provide a rotational movement, the at least two servo motors comprising a first servo motor which is assigned to the ram and to the first pressure point group and a second servo motor which is assigned to the ram and to the second pressure point group,
      at least two cam gears, the at least two cam gears comprising a first cam gear and a second cam gear, the first cam gear being configured to convert the rotational movement of the first servo motor into a linear movement, and the second cam gear being configured to convert the rotational movement of the second servo motor into a linear movement,
      at least two pull rods, the at least two pull rods comprising a first pull rod and a second pull rod, the first pull rod being operatively connected to the first cam gear and being configured to be provided with the linear movement so as to drive the ram via the first pressure point group, and the second pull rod being operatively connected to the second cam gear and being configured to be provided with the linear movement so as to drive the ram via the second pressure point group,
      a press bed,
      a bottom die arranged on the press bed,
      a top die operatively connected to the ram,
      a process cushion arranged in at least one of the ram, the press bed, the bottom die, and the top die,
      a force sensor configured to detect an actual force value feedback, and
      a temperature sensor configured to detect an actual temperature value feedback,
   the device comprising:
      an NC control device which is configured to control at least one of a position, a speed and a force of each hydraulic pressure cushion assigned to the pressure points of the ram for a first auxiliary function and the process cushion for a second auxiliary function, the NC control device comprising:
         a positional cam profile which is configured to control at least one of a position, a speed, a torque and a force of the at least two servo motors for driving the pressure points of the ram, the positional cam profile being controlled by a virtual control shaft;
         a sequential control;
         a storage device for machine and die data;
         a first functional unit for calculating pressure point-specific curves of a target force value for each hydraulic pressure cushion of the first auxiliary function;
         a second functional unit for a force control of each hydraulic pressure cushion;
         a third functional unit for calculating cushion-specific curves of a target force value for the process cushion of the second auxiliary function;
         a fourth functional unit for a force control of the process cushion;
         a fifth functional unit for calculating pressure point-specific curves of a target position with initial correction values;
         a sixth functional unit for a position control of the pressure points of the ram as a main function;
         a seventh functional unit for calculating pressure point-specific force correction values, input values for the seventh functional unit being measured signals of the actual force value feedback, and output values of the seventh functional unit when summed together with output values of the first functional unit for calculating the pressure point-specific curves of the target force value determine input values into the second functional unit for the force control of each hydraulic pressure cushion; and
         an eighth functional unit for calculating cushion-specific force correction values, input values of the eighth function unit being measured signals of the actual force value feedback and the actual temperature value feedback, and output values of the eighth functional unit when summed together with output values of the third functional unit for calculating the cushion-specific curves of the target force value determine input values into the fourth functional unit for the force control of the process cushion.

12. The method as recited in claim 9, wherein the process cushion of the second auxiliary function is arranged in the top die.

13. The method as recited in claim 9, wherein the process cushion of the second auxiliary function is arranged in the ram.

14. The method as recited in claim 10, wherein the process cushion of the second auxiliary function is arranged in the top die.

15. The method as recited in claim 10, wherein the process cushion of the second auxiliary function is arranged in the ram.

16. The device as recited in claim 11, wherein the process cushion of the second auxiliary function is arranged in the top die.

17. The device as recited in claim 11, wherein the process cushion of the second auxiliary function is arranged in the ram of the press.

* * * * *